US012512030B2

(12) United States Patent
Choi et al.

(10) Patent No.: US 12,512,030 B2
(45) Date of Patent: Dec. 30, 2025

(54) POWER SAVING IN OLED DISPLAYS WITH MULTIPLE REFRESH RATES

(71) Applicant: Google LLC, Mountain View, CA (US)

(72) Inventors: Sangmoo Choi, Palo Alto, CA (US); Sang Young Youn, Cupertino, CA (US); Chang Ju Kang, Cupertino, CA (US); Sun-il Chang, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/010,896

(22) Filed: Jan. 6, 2025

(65) Prior Publication Data

US 2025/0140155 A1 May 1, 2025

Related U.S. Application Data

(63) Continuation of application No. 18/261,245, filed as application No. PCT/US2021/070150 on Feb. 12, 2021, now Pat. No. 12,223,876.

(Continued)

(51) Int. Cl.
*G09G 3/20* (2006.01)
*G09G 3/3233* (2016.01)

(52) U.S. Cl.
CPC ......... *G09G 3/2007* (2013.01); *G09G 3/3233* (2013.01); *G09G 2300/0819* (2013.01);
(Continued)

(58) Field of Classification Search
CPC ............... G09G 3/2007; G09G 3/3233; G09G 2300/0819; G09G 2300/0842;
(Continued)

(56) References Cited

U.S. PATENT DOCUMENTS

| | | | |
|---|---|---|---|
| 9,262,987 | B2 | 2/2016 | Albrecht et al. |
| 9,620,064 | B2 | 4/2017 | Albrecht et al. |

(Continued)

FOREIGN PATENT DOCUMENTS

| | | |
|---|---|---|
| CN | 104795031 A | 7/2015 |
| CN | 106991944 A | 7/2017 |

(Continued)

OTHER PUBLICATIONS

International Preliminary Report on Patentability in International Appln. No. PCT/US2021/070150, mailed on Aug. 24, 2023, 10 pages.

(Continued)

*Primary Examiner* — Michael J Jansen, II
(74) *Attorney, Agent, or Firm* — Fish & Richardson P.C.

(57) ABSTRACT

Rendering images on an active area of an OLED includes rendering images on the active area of the display panel with a plurality of different frame rates. For a plurality of the different frame rates having a frame rate that matches or is above a threshold frame rate, an image refresh operation is performed once per frame period and a self-refresh operation is not performed during the frame period. When rendering images on the active area, for at least one of the different frame rates having a frame rate that is lower than the threshold frame rate, an image refresh operation is performed once per frame period and a self-refresh operation is performed at least once during the frame period.

13 Claims, 15 Drawing Sheets

Related U.S. Application Data

(60) Provisional application No. 63/148,598, filed on Feb. 11, 2021.

(52) U.S. Cl.
CPC . *G09G 2300/0842* (2013.01); *G09G 2310/08* (2013.01); *G09G 2320/0247* (2013.01); *G09G 2320/0673* (2013.01); *G09G 2330/021* (2013.01); *G09G 2340/0435* (2013.01); *G09G 2360/16* (2013.01)

(58) Field of Classification Search
CPC ....... G09G 2310/08; G09G 2320/0247; G09G 2320/0673; G09G 2330/021; G09G 2340/0435; G09G 2360/16
See application file for complete search history.

(56) References Cited

U.S. PATENT DOCUMENTS

| | | | | |
|---|---|---|---|---|
| 9,858,869 | B2 | 1/2018 | Yoo et al. | |
| 9,886,915 | B2 | 2/2018 | Chen | |
| 10,510,292 | B2 | 12/2019 | Jang | |
| 10,629,139 | B2 | 4/2020 | Yang | |
| 10,923,044 | B2 | 2/2021 | Koo et al. | |
| 11,056,060 | B2 * | 7/2021 | Kim | G09G 3/3233 |
| 11,195,465 | B2 | 12/2021 | Lee et al. | |
| 11,257,437 | B2 | 2/2022 | Kim et al. | |
| 11,271,181 | B1 * | 3/2022 | Yang | G09G 3/2092 |
| 11,295,669 | B2 * | 4/2022 | Wang | G09G 3/3266 |
| 11,393,399 | B2 * | 7/2022 | Na | H10K 59/1216 |
| 11,538,407 | B2 | 12/2022 | Lee et al. | |
| 11,935,473 | B2 * | 3/2024 | Nakamura | G09G 3/3266 |
| 2007/0195110 | A1 | 8/2007 | Nagase et al. | |
| 2014/0267370 | A1 | 9/2014 | Albrecht et al. | |
| 2014/0267448 | A1 | 9/2014 | Albrecht et al. | |
| 2016/0293113 | A1 | 10/2016 | Yoo et al. | |
| 2016/0322006 | A1 | 11/2016 | Chen | |
| 2017/0092191 | A1 | 3/2017 | An et al. | |
| 2018/0074569 | A1 | 3/2018 | An et al. | |
| 2018/0122300 | A1 | 5/2018 | Jang | |
| 2020/0043425 | A1 | 2/2020 | Yang | |
| 2020/0175930 | A1 | 6/2020 | Koo et al. | |
| 2020/0219450 | A1 | 7/2020 | Lee et al. | |
| 2020/0243008 | A1 | 7/2020 | Lee et al. | |
| 2020/0394961 | A1 * | 12/2020 | Kim | G09G 3/3266 |
| 2021/0287605 | A1 * | 9/2021 | Wang | G09G 3/3233 |
| 2021/0319755 | A1 | 10/2021 | Kim et al. | |
| 2021/0366397 | A1 * | 11/2021 | Na | G09G 3/3291 |
| 2023/0351960 | A1 * | 11/2023 | Nakamura | G09G 3/3266 |

FOREIGN PATENT DOCUMENTS

| | | | |
|---|---|---|---|
| CN | 111429837 | A | 7/2020 |
| CN | 111489674 | A | 8/2020 |
| CN | 111833802 | A | 10/2020 |

OTHER PUBLICATIONS

International Search Report and Written Opinion in International Appln. No. PCT/US2021/070150, mailed on Oct. 21, 2021, 13 pages.

Office Action in European Appln. No. 21710860.4, mailed on Oct. 31, 2025, 8 pages.

Office Action in Chinese Appln. No. 202180093223.5, mailed on Oct. 28, 2025, 21 pages (with English translation).

* cited by examiner

POWER SAVING IN OLED DISPLAYS WITH MULTIPLE REFRESH RATES

CROSS-REFERENCE TO RELATED APPLICATION

This application is a continuation of U.S. patent application Ser. No. 18/261,245, filed Jul. 12, 2023, which is a National Stage Application under 35 U.S.C. § 371 and claims the benefit of International Patent Application No. PCT/US2021/070150, filed on Feb. 12, 2021, entitled "POWER SAVING IN OLED DISPLAYS WITH MULTIPLE REFRESH RATES", which claims the benefit under 35 U.S.C. § 119(e) of priority to U.S. Provisional Patent Application No. 63/148,598, filed on Feb. 11, 2021, entitled "POWER SAVING IN OLED DISPLAYS WITH MULTIPLE REFRESH RATES". The disclosure of each application is incorporated by reference herein in their entirety.

TECHNICAL FIELD

This description relates to displays on computing devices.

BACKGROUND

Displays for computing devices can have modifiable refresh rates, or rates of updating or changing pixel content. In general, lower refresh rates reduce power consumption by the display, increasing battery life, whereas higher refresh rates can improve graphical output.

SUMMARY

In a general aspect, a display panel includes a plurality of pixels arranged in an array, the array including rows and columns, each pixel of the array including at least one OLED light-emitting device. The display panel further includes a plurality of pixel circuits, each pixel circuit associated with one of the OLED light-emitting devices and configured to drive its associated OLED light-emitting device. The display panel further includes a plurality of scan lines configured for selecting the pixel circuits associated with each row of the pixels, a plurality of column data lines configured for controlling the pixel circuits associated with each column of the pixels, and a plurality of emission lines configured for supplying signals to pixel circuits associated with each row of the pixels to cause the pixel circuits to supply driving current to anodes of OLED pixels of the row. The display panel further includes a device driver configured to supply signals to the scan lines, the column lines and the emission lines to cause the display to render images on an active area of the panel with a plurality of different frame rates. When rendering images on the active area, for a plurality of the different frame rates having a frame rate that matches or is above a threshold frame rate, an image refresh operation is performed once per frame period and a self-refresh operation is not performed during the frame period. When rendering images on the active area, for at least one of the different frame rates having a frame rate that is lower than the threshold frame rate, an image refresh operation is performed once per frame period, and a self-refresh operation is performed at least once during the frame period.

Implementations can include one or more of the following features, alone or in any combination with each other.

For example, each of the pixel circuits can include at least two metal oxide transistors. The threshold rate can be 60 Hz or lower. The different frame rates having a frame rate lower than the threshold frame rate can have rates that are factors of the threshold frame rate. The device driver can be configured to apply a first gamma correction value when rendering frames at frame rates at and below the threshold rate, and to apply a second gamma correction value, different from the first gamma correction value, when rendering frames at a frame rate that is higher than the threshold rate.

When the threshold frame rate is N Hz, with N being a real value, each of the different frame rates having frame rates lower than N can have a frame rate that is a factor of N. A number of self-refresh operations performed during the rendering of a frame at one of the different frame rates of M Hz, can be (N/M−1).

The device driver can be further configured to supply signals to the scan lines, the column lines and the emission lines to cause the display panel to, when rendering images on the active area at one of the different frame rates having a frame rate that is lower than the threshold frame rate, perform an image refresh operation once per frame period, when a brightness of an active area of the display panel is lower than a threshold brightness, perform a self-refresh operation at least once during the frame period, and when a brightness of the active area of the display panel is lower than the threshold brightness, perform no self-refresh operations during the frame period. The device driver can be further configured to supply signals to the scan lines, the column lines and the emission lines to cause the display panel to, when rendering images on the active area: when self-refresh operations are performed at least once during the frame period, apply a first gamma correction value to the rendering of images, and, when no self-refresh operations are performed during the frame period, apply a second gamma correction value, different from the first gamma correction value, to the rendering of images.

The device driver can be further configured to supply signals to the scan lines, the column lines and the emission lines to cause the display panel to, when rendering images on the active area at one of the different frame rates having a frame rate that is lower than the threshold frame rate, perform an image refresh operation once per frame period, when a gray level of an active area of the display panel is lower than a threshold brightness, perform a self-refresh operation at least once during the frame period, and when a gray level of the active area of the display panel is lower than the threshold brightness, perform no self-refresh operations during the frame period. The gray level can be based on a mean gray level of all the pixels in the active area. The gray level can be based on a percentage of pixels in the active area whose gray level is above a threshold gray level.

When rendering images on the active area, the device driver can be further configured to supply signals to the scan lines, the column lines and the emission lines to cause the display panel to: when self-refresh operations are performed at least once during the frame period, apply a first gamma correction value to the rendering of images, and, when no self-refresh operations are performed during the frame period, apply a second gamma correction value, different from the first gamma correction value, to the rendering of images.

The device driver can be further configured to supply signals to the scan lines, the column lines and the emission lines to cause the display panel to: render frames of images on an active area of the panel with one of the different frame rates having a rate that is lower than the threshold rate, where the rendering includes: performing an image refresh operation once per frame period, and, based on a value of a function of a brightness level of an active area of the display panel and a gray level of the frames being rendered: when the value of the function is above a threshold value, performing a self-refresh operation at least once during the frame period, and when the value of the function is lower than the threshold value, performing no self-refresh operations during the frame period. A first partial derivative of the function with respect to the gray level value can be negative and a second partial derivative of the function with respect to the panel brightness value can be positive. When rendering frames of images on the active area, the device driver can be further configured to supply signals to the scan lines, the column lines and the emission lines to cause the display panel to, when self-refresh operations are performed at least once during the frame period, apply a first gamma correction value to the rendering of images, and when no self-refresh operations are performed during the frame period, apply a second gamma correction value, different from the first gamma correction value, to the rendering of frames.

In another general aspect, a display panel includes a plurality of pixels arranged in an array, the array including rows and columns, each pixel of the array including at least one OLED light-emitting device. The display panel includes a plurality of pixel circuits, each pixel circuit associated with one of the OLED light-emitting devices and configured to drive its associated OLED light-emitting device. The display panel includes a plurality of scan lines configured for selecting the pixel circuits associated with each row of the pixels, a plurality of column data lines configured for controlling the pixel circuits associated with each column of the pixels, and a plurality of emission lines configured for supplying signals to pixel circuits associated with each row of the pixels to cause the pixel circuits to supply driving current to anodes of OLED pixels of the row. The display panel includes a device driver configured to supply signals to the scan lines, the column lines and the emission lines to cause the display panel to render images on an active area of the panel with a plurality of different frame rates. When rendering images on the active area, for a plurality of the different frame rates having a frame rate that matches or is above a threshold frame rate, an image refresh operation is performed once per frame period and not performed a self-refresh operation during the frame period. When rendering images on the active area, for at least one of the different frame rates having a frame rate that is lower than the threshold frame rate, an image refresh operation is performed once per frame period and a self-refresh operation is performed at least once during the frame period. The device driver is configured to apply a single gamma correction value when rendering frames at one or more frame rates at and below the threshold rate and when rendering frames at a frame rate that is higher than the threshold rate.

Implementations may include one or more of the following features, alone or in any combination with each other. For example, each of the pixel circuits can include at least two metal oxide transistors. The threshold rate can be 60 Hz or lower. The different frame rates having a frame rate lower than the threshold frame rate can have rates that are factors of the threshold frame rate. When the threshold frame rate is N Hz, with N being a real value, each of the different frame rates having frame rates lower than N can have a frame rate that is a factor of N. A number of self-refresh operations performed during the rendering of a frame at one of the different frame rates of MHz, can be (N/M−1).

In another general aspect, a method of rendering images on an active area of a display panel, with the display panel including a plurality of pixels arranged in an array of OLED pixels, each pixel of the array including at least one OLED light-emitting device, a plurality of pixel circuits, each pixel circuit associated with one of the OLED light-emitting devices and configured to drive its associated OLED light-emitting device, includes rendering images on the active area of the display panel with a plurality of different frame rates, when rendering images on the active area, for a plurality of the different frame rates having a frame rate that matches or is above a threshold frame rate, performing an image refresh operation once per frame period and not performing a self-refresh operation during the frame period, and when rendering images on the active area, for at least one of the different frame rates having a frame rate that is lower than the threshold frame rate, performing an image refresh operation once per frame period and performing a self-refresh operation at least once during the frame period.

Implementations can include one or more of the following features, alone or in any combination with each other. For example, the threshold rate can be 60 Hz or lower. The different frame rates having a frame rate lower than the threshold frame rate can have rates that are factors of the threshold frame rate.

The method can further include applying a first gamma correction value when rendering frames at frame rates at and below the threshold rate, and applying a second gamma correction value, different from the first gamma correction value, when rendering frames at a frame rate that is higher than the threshold rate. When the threshold frame rate is N Hz, with N being a real value, each of the different frame rates having frame rates lower than N have a frame rate that is a factor of N, and a number of self-refresh operations performed during the rendering of a frame at one of the different frame rates of M Hz, can be (N/M−1).

When rendering images on the active area at one of the different frame rates having a frame rate that is lower than the threshold frame rate, an image refresh operation can be performed once per frame period, and when a brightness of an active area of the display panel is lower than a threshold brightness, a self-refresh operation can be performed at least once during the frame period, and, when a brightness of the active area of the display panel is lower than the threshold brightness, no self-refresh operations may be performed during the frame period.

When rendering images on the active area, when self-refresh operations are performed at least once during the frame period, a first gamma correction value can be applied to the rendering of images, and, when no self-refresh operations are performed during the frame period, a second gamma correction value, different from the first gamma correction value, can be applied to the rendering of images.

When rendering images on the active area at one of the different frame rates having a frame rate that is lower than the threshold frame rate an image refresh operation can be performed once per frame period, and when a gray level of an active area of the display panel is lower than a threshold brightness, a self-refresh operation can be performed at least once during the frame period, and, when a gray level of the active area of the display panel is lower than the threshold brightness, no self-refresh operations can be performed during the frame period. The gray level can be based on a mean gray level of all the pixels in the active area. The gray level can be based on a percentage of pixels in the active area whose gray level is above a threshold gray level.

When rendering images on the active area, when self-refresh operations are performed at least once during the frame period, a first gamma correction value can be applied to the rendering of images, and when no self-refresh operations are performed during the frame period, a second gamma correction value, different from the first gamma correction value, can be applied to the rendering of images.

The method can further include rendering frames of images on an active area of the panel with one of the different frame rates having a rate that is lower than the threshold rate, where the rendering includes performing an image refresh operation once per frame period, and, based on a value of a function of a brightness level of an active area of the display panel and a gray level of the frames being rendered: when the value of the function is above a threshold value, a self-refresh operation can be performed at least once during the frame period, and when the value of the function is lower than the threshold value, no self-refresh operations can be performed during the frame period. A first partial derivative of the function with respect to the gray level value can be negative and a second partial derivative of the function with respect to the panel brightness value can be positive. The method can further include, when self-refresh operations are performed at least once during the frame period, applying a first gamma correction value to the rendering of images, and, when no self-refresh operations are performed during the frame period, applying a second gamma correction value, different from the first gamma correction value, to the rendering of frames.

In another general aspect, a method of rendering images on an active area of a display panel, with the display panel including a plurality of pixels arranged in an array of OLED pixels, each pixel of the array including at least one OLED light-emitting device, a plurality of pixel circuits, each pixel circuit associated with one of the OLED light-emitting devices and configured to drive its associated OLED light-emitting device, includes rendering images on the active area of the panel with a plurality of different frame rates, when rendering images on the active area, for a plurality of the different frame rates having a frame rate that matches or is above a threshold frame rate, performing an image refresh operation once per frame period and not performing a self-refresh operation during the frame period, and, when rendering images on the active area, for at least one of the different frame rates having a frame rate that is lower than the threshold frame rate, performing an image refresh operation once per frame period and performing a self-refresh operation at least once during the frame period, and applying a single gamma correction value when rendering frames at one or more frame rates at and below the threshold rate and when rendering frames at a frame rate that is higher than the threshold rate.

Implementations can include one or more of the following features, alone or in any combination with each other. For example, each of the pixel circuits can include at least two metal oxide transistors. The threshold rate can be 60 Hz or lower.

The different frame rates having a frame rate lower than the threshold frame rate can have rates that are factors of the threshold frame rate. When the threshold frame rate is N Hz, with N being a real value, each of the different frame rates having frame rates lower than N can have a frame rate that is a factor of N, and a number of self-refresh operations performed during the rendering of a frame at one of the different frame rates of M Hz, can be (N/M−1).

The details of one or more implementations are set forth in the accompanying drawings and the description below. Other features will be apparent from the description and drawings, and from the claims. Any feature(s) described herein in relation to one aspect, embodiment, example, or implementation may be combined with any other feature(s) described herein in relation to any other aspect, embodiment, example, or implementation as appropriate and applicable.

BRIEF DESCRIPTION OF THE DRA WINGS

Figure 9A:
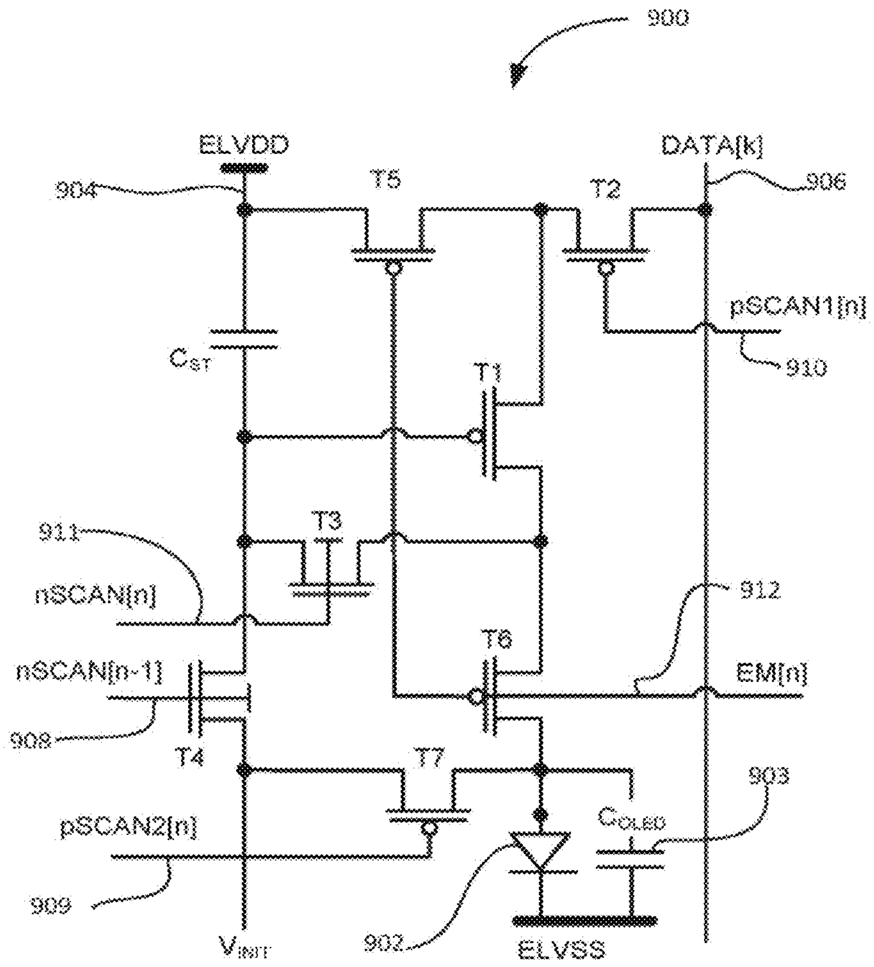
FIG. 9A is a schematic diagram of a circuit for driving a light emitting device of a pixel in an active area of a display panel, for supplying a data signal to the device and for refreshing the device to receive a new data signal.
Figure 9B:
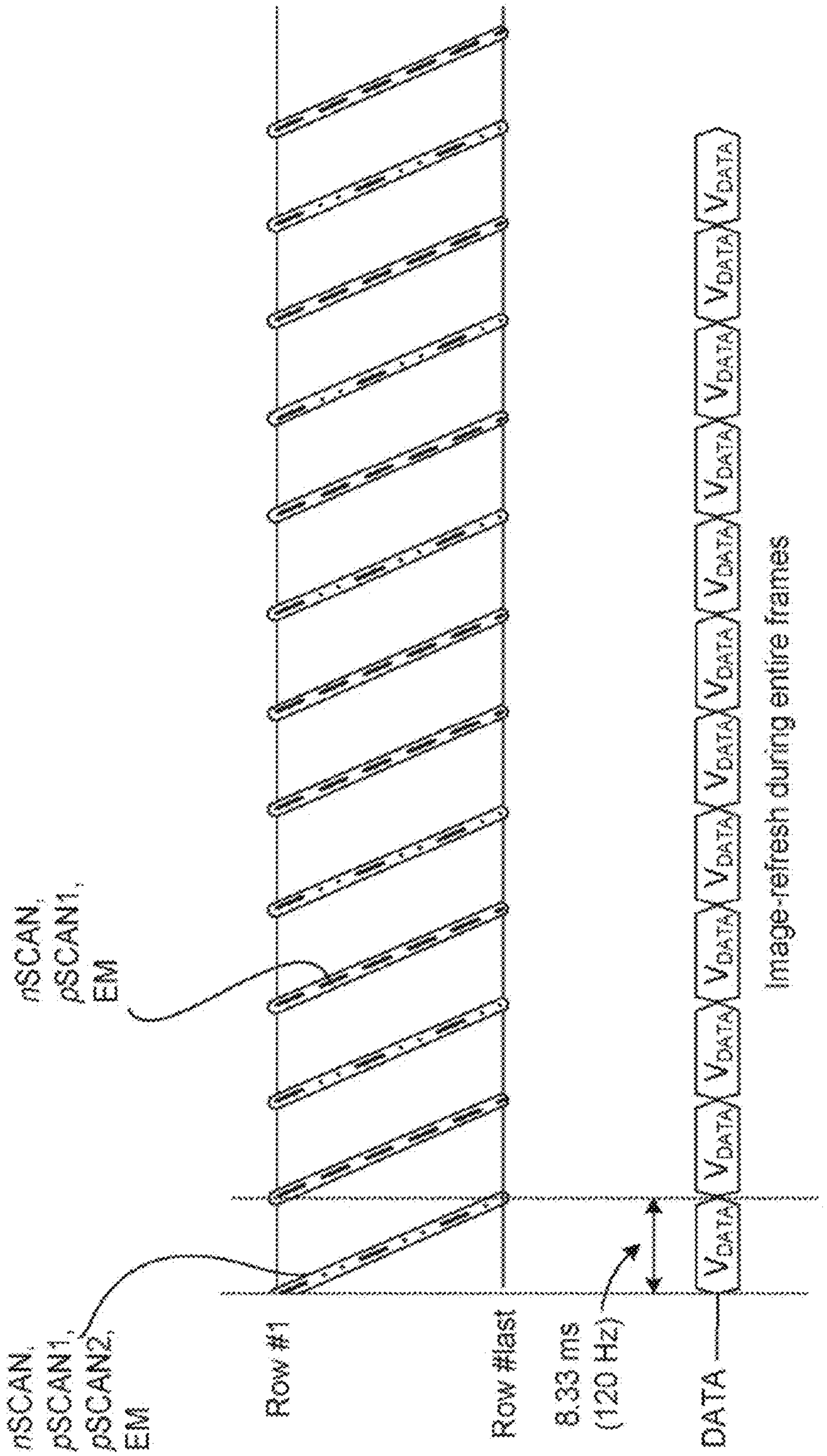

FIG. 9B schematic timing diagram of signals for controlling the image refresh and anode discharging operations of a pixel with the circuit of FIG. 9A, when the frame rate is higher than the basis frame rate.

Figure 9C:
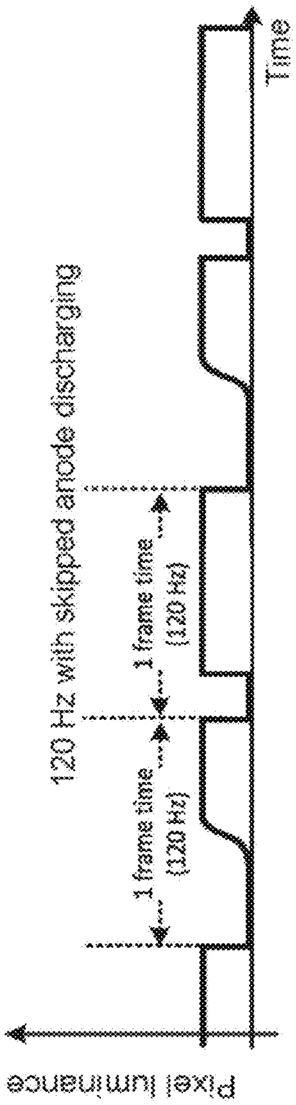

FIG. 9C is a schematic graph of the instantaneous luminance of a pixel as a function of time over a plurality of frames when the pixel is operated at a 120 Hz frame rate and the anode of the pixel is discharged at a rate of 60 Hz.

Figure 10:
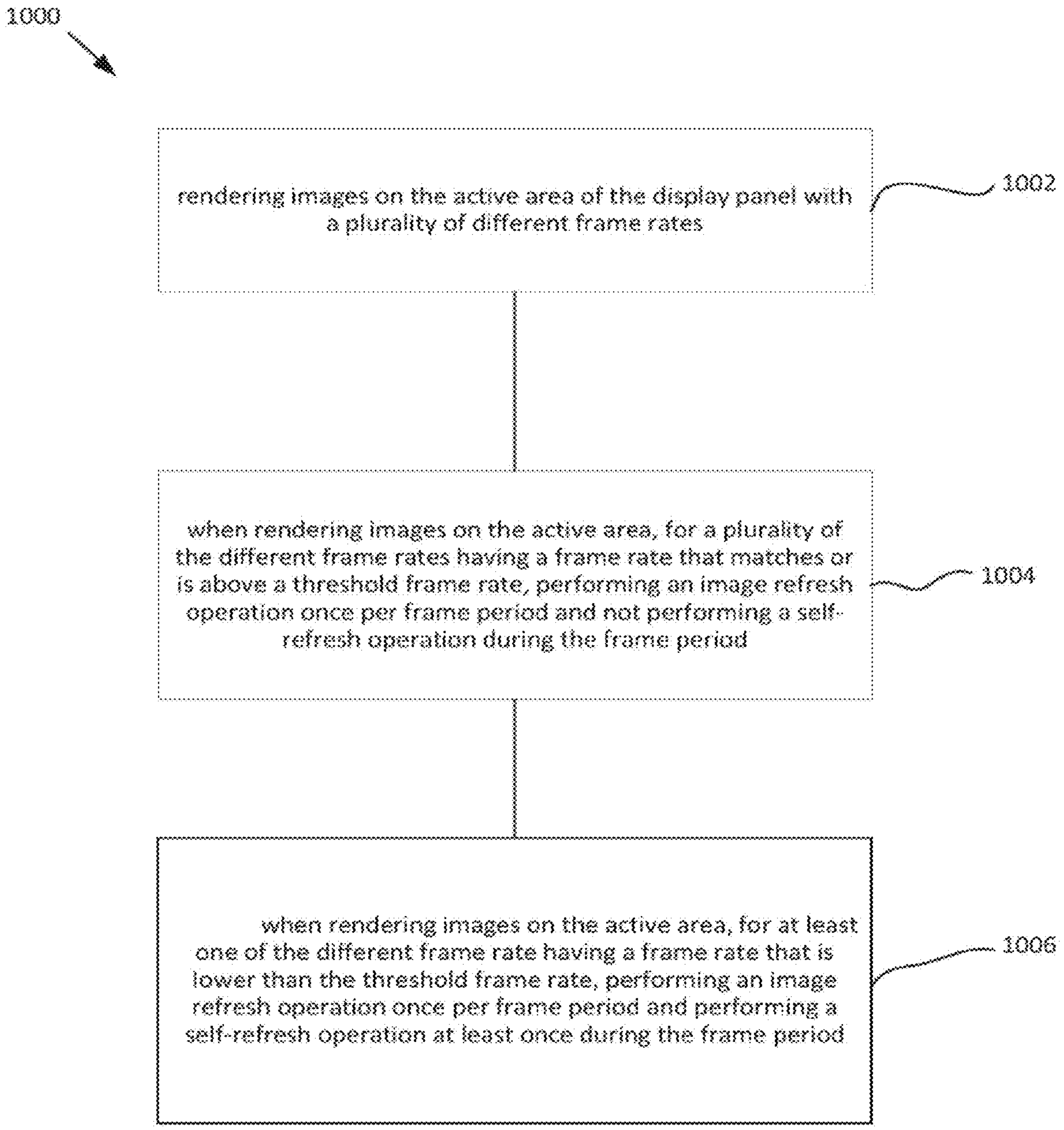

FIG. 10 is a schematic diagram of a process for rendering images on a display panel.

Figure 11:
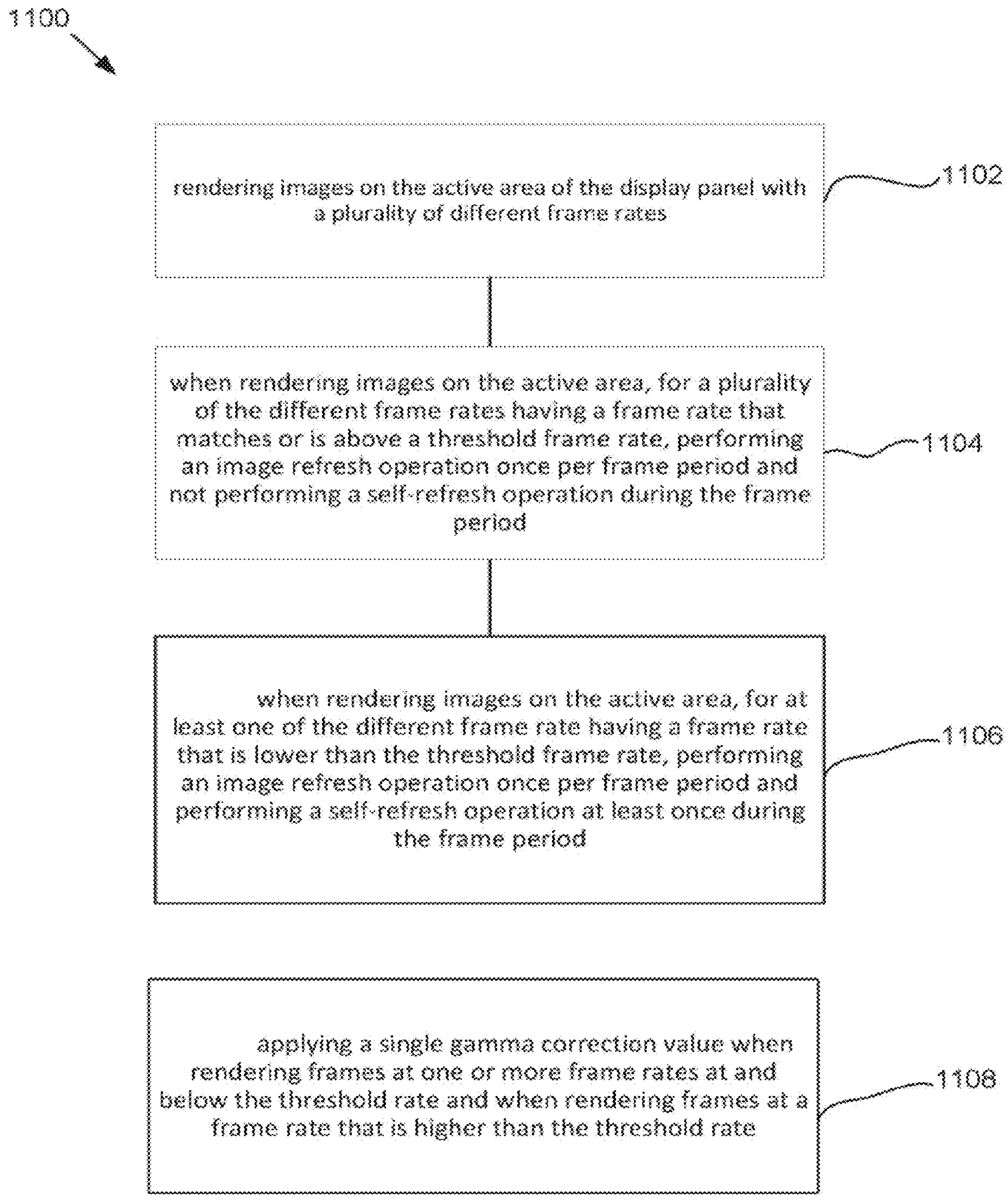

FIG. 11 is a schematic diagram of a process for rendering images on a display panel.

Like reference numbers refer to like elements. In the following description, where relative terms, such as “top”, “topmost”, “bottom”, “bottommost”, “higher” and “lower” are used with reference to a display, device, system, feature thereof and/or otherwise, these may refer to the “top”, “bottom” etc. of the relevant display, device, system, feature thereof etc. when it is in the orientation in which it is intended to be used and/or viewed by a user.

DETAILED DESCRIPTION

A refresh rate of a display can represent a rate at which rows of pixels in the display are refreshed (i.e., have the amount or color of light emitted from the pixels updated), and/or receive signals that cause the pixels to generate an updated image on the display. In general, a higher refresh rate can improve image quality in applications in which the image changes, such as video applications or video game applications, and a lower refresh rate can reduce power consumption by the display. However, when a display configured to operate at both high refresh rates and low refresh rates, technical problems can include that the optical performance of the display may be different at the different refresh rates, which may be distracting or unpleasant to a viewer of the display, and/or the power saving of operating the device at the lower refresh rate may be compromised by attempts made to have a uniform optical performance at the different refresh rates.

Figure 1:
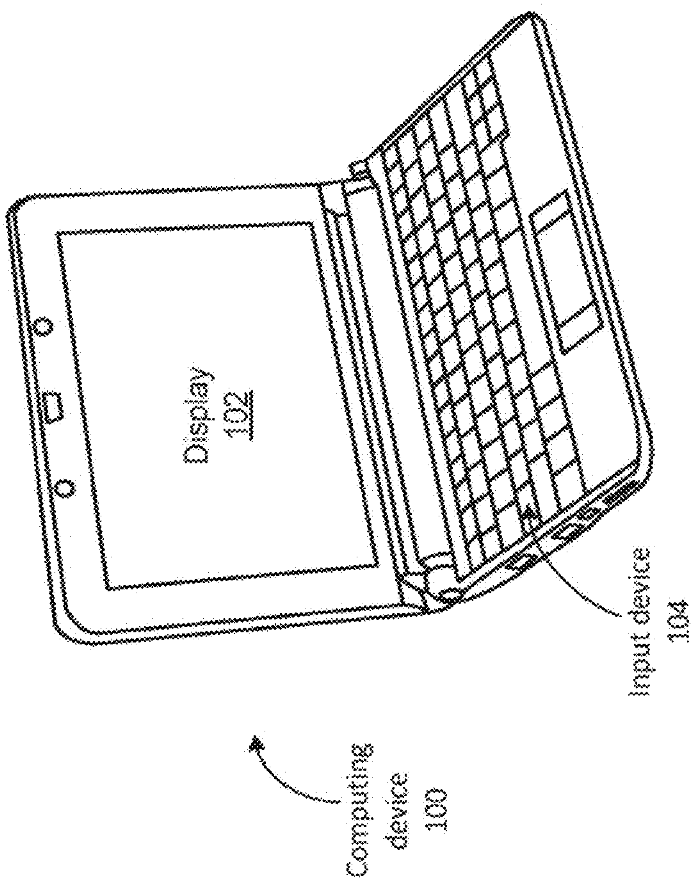
FIG. 1 is a diagram of a computing device according to an example implementation.

FIG. 1 is a diagram of a computing device 100 according to an example implementation. The computing device 100 can include a display 102 and an input device 104. The display 102 can present, provide, output, and/or display graphical and/or visual output. In some examples, the display 102 can include a touchscreen display that receives touch input, such as a capacitive touchscreen display and/or a resistive touchscreen display. The display 102 can include a light-emitting diode (LED) display, such as an organic LED (OLED) display and/or active-matrix organic LED (AMOLED) display, as non-limiting examples.

The input device 104 can receive input from a user. The input device 104 can include, for example, a keyboard, a trackpad, or a home button, as non-limiting examples.

Figure 2:
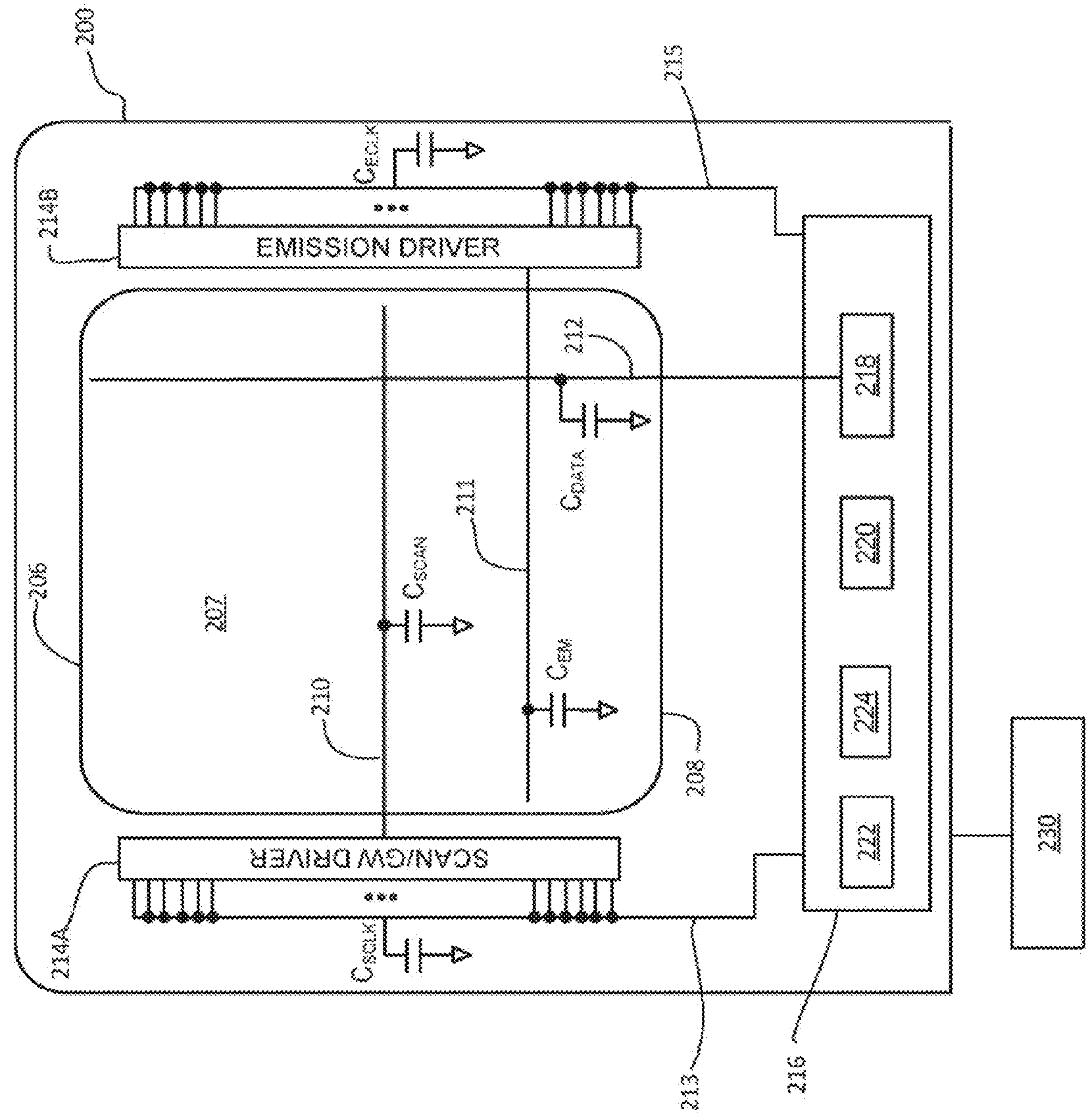
FIG. 2 is a schematic diagram of a display panel that can be used in the display included in the computing device of FIG. 1.

FIG. 2 is a schematic diagram of a display panel 200 that is part of, and used in, the display 102 included in the computing device 100 of FIG. 1. The display panel 200 can include an array of pixels, and a pixel circuit for driving the pixel associated with each pixel, with the array having rows and columns. The display panel 200 can include multiple horizontal signal lines 210, 211 that provide signals to rows of pixel circuits in the display panel. The horizontal signal lines can include a plurality of scan lines 210 for selecting the pixel circuits of each row of pixel circuits and a plurality of emission lines for controlling the electric current transfer to the emissive device (e.g., OLEDs) in the pixel circuits.

For clarity, two horizontal signal lines (a scan line 210, and an emission line 211) are shown in FIG. 2, but many more horizontal signal lines exist in the display panel 200. Horizontal may refer to their position when the computing device 100 is in the orientation in which it is intended to be used. The horizontal signals lines 210 and/or rows of pixels can be numbered sequentially from a top portion 206 of an active area 207 of the display panel 200 to a bottom portion 208 of the active area 207 of the display panel 200. The top portion 206 of the active area 207 refers to the top portion of the active arca 207 when the display panel 200 is in the orientation in which it is to be viewed by a user.

During each frame that is displayed, the horizontal signal lines 210, 211 can sequentially and/or successively provide signals to the rows of pixels, with the first and/or topmost row of pixels receiving signals at or near a beginning of the frame and the last and/or the lower-most and/or bottommost row of pixels receiving signals at or near an end of the frame. The display panel 200 can include a scan line driver 214A and an emission line driver 214B that provide signals on the horizontal signal lines 210, 211. For example, signals provided by the scan line driver 214A over a scan line 210 to a pixel can be used to initialize and reset a pixel for receiving new data signals when a new frame is provided to the display panel, and signals provided by the emission line driver 214B over an emission line 211 to a pixel can be used to turn driving current to the pixel on or off.

The display can include column data lines 212 for controlling the pixel circuits of each column of pixel circuits (e.g., by writing a data voltage for driving the pixel to the pixel circuit associated with the pixel). For clarity, only one column data line is shown in FIG. 2, but many more exist in the display panel 200. The column data lines 212 can provide signals to columns of pixels in the active area 207 of the display panel 200. The horizontal signal lines 210, 211 and the column data lines 212 can combine to provide signals to individual pixels on the display panel 200, causing the individual pixels to emit a specific amount and color of light seen by a user. The display panel 200 can include a column line driver 218 that provides signals to the column data lines 212.

The display panel 200 can include a display driver 216 that can control the output of the display panel 200, such as by providing input to the horizontal signal lines 210 via the gate line driver 214A and the emission line driver 214B, and by providing input to the column data lines 212 via the column line driver 218.

The display driver 216 can include a timing controller 220. The timing controller 220 can generate and/or provide signals to the horizontal signal lines 210 via the gate line driver 214A and the emission line driver 214B, and to column data lines 212 via the column line driver 218. The signals can include clock signals and/or start pulses. The signals generated and/or provided by the timing controller 220 can instruct and/or prompt the horizontal signal lines 210 and/or column data lines 212 to refresh and/or update the image presented by the pixels, such as by sending signals to the pixels. The timing controller 220 can send and/or provide the signals to the gate line drivers 214A, 214B. The display driver 216 can include a memory 222 that stores executable instructions for controlling pixels in the active area 207 of the display panel 200. The display driver 216 can include a gamma buffer 224 that stores parameters used to adjust values of signals provided to pixels in the active area 207, so that a desired optical output is produced by the display panel 200.

The display driver 216 of the display panel 200 can communicate with an external processor 230 (e.g., a GPU or a processor that is part of a system-on-a-chip (SoC)) that can provide signals to the display driver for driving pixels in the active arca 207 of the panel.

When the display panel 200 operates to display video and/or still images with the frames of the video/images being refreshed in the active area 207, power is consumed by the display panel 200. The LEDs themselves in the pixels of the active arca 207 consume power, but a significant factor contributing to the overall power consumption of the display panel 200 is the dynamic power dissipation in driving panel circuits, including row line drivers (e.g., gate line driver 214A, emission line driver 214B, and column line driver 218) and the pixel circuits in the active area 207 of the display panel 200. For example, power is dissipated due to the parasitic capacitance associated with charging data lines 212 (as represented by $C_{DATA}$ in FIG. 2), with charging scan lines 210 (as represented by $C_{SCAN}$ in FIG. 2), with charging emission lines 211 (as represented by $C_{EM}$ in FIG. 2), with charging lines 213 supplying signals (e.g., clock signals) to the scan line driver (as represented by $C_{SCLK}$ in FIG. 2), and with charging lines 215 supplying signals (e.g., clock signals) to the emission line driver (as represented by $C_{ECLK}$ in FIG. 2). As high display refresh rates (e.g., 120 Hz and 90 Hz) become popular for high quality displays, the power dissipation due to parasitic capacitance becomes a significant drain on the battery that powers in computing device that includes the display panel 200. Power consumed by the display panel 200 is reduced when the display panel is operated at relatively lower refresh rates. However, simply reducing the refresh rate of the display panel 200 can affect the optical performance of the active area 207 of the panel 200, as the optical performance can depend on the refresh rate. Thus, as described herein, circuits for supplying signals to pixels in the active area 207 of the display and techniques for driving the circuits can ensure consistent optical performance of the active area 207 of the display panel 200 when the panel is operated at different refresh rates.

Figure 3B:
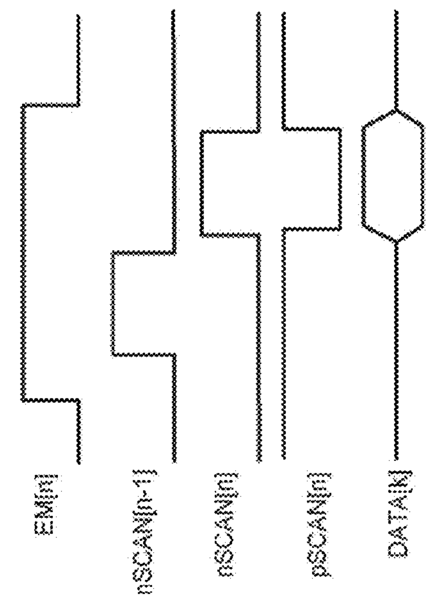
FIG. 3B is a schematic timing diagram of signals for controlling the operation of a light emitting device with the circuit of FIG. 3A.
Figure 3A:
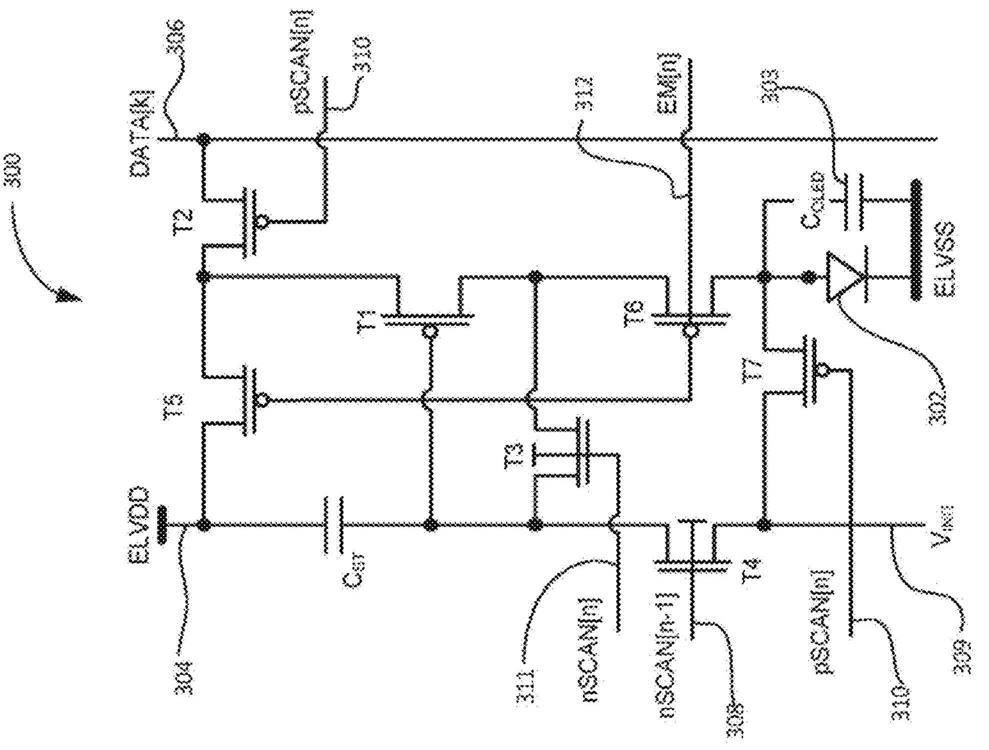
FIG. 3A is a schematic diagram of a circuit for driving a light emitting device of a pixel in an active area of a display panel.

FIG. 3A is a schematic diagram of a circuit 300 for driving a light emitting device (e.g., an organic light emitting diode (OLED)) 302 of a pixel in an active area of a display panel, for supplying a data signal to the device 302 and for refreshing the device 302 to receive a new data signal. The light emitting device 302 can have a capacitance (represented by capacitor 303), such that changing a voltage level across the light emitting device 302 dissipates power. FIG. 3B is a schematic timing diagram for controlling the operation of the light emitting device 302 with the circuit 300.

The circuit 300 can be connected to an initialization voltage supplying line 309 that supplies an initialization voltage $V_{INIT}$, a first power line 304 that supplies a voltage ELVDD, and a data line 306 that supplies a data voltage DATA[k]. Additionally, the circuit 300 can be connected to an (n-1)$^{th}$ scan line 308 that supplies signals SCAN[n-1], to an p-n$^{th}$ scan line 310 that supplies signals pSCAN[n], to an n-n$^{th}$ scan line 311 that supplies signals nSCAN[n], and to an emission line 312 that supplies signals EM[n].

The circuit 300 can include a driving transistor T1, second to seventh transistors T2 to T7, and a storage capacitor CST, which are configured to drive the light emitting device 302. Each of the transistors T1 to T7 can be implemented using p-channel or n-channel thin film transistor (TFT) technology. In an example implementation, transistors T3 and T4 are implemented as n-channel transistors, while transistors T1, T2, T5, T6, and T7 are implemented asp-channel transistors. For example, transistors T1, T2, T5, T6, and T7 can be low-temperature poly-silicon (LTPS) transistors, and transistors T3 and T4 can be metal oxide transistors. The light emitting device (e.g., OLED) 302 can include an anode connected to the driving transistor T1 through the driving current control switch transistor, T6, a cathode connected to a low voltage supply voltage ELVSS, and a light emitting layer between the anode and the cathode that generates light, where the amount of generated light is proportional to the amount of current supplied from the driving transistor T1.

A first electrode of the storage capacitor $Cs_T$ of the circuit 300 can be connected to the line 304 that supplies voltage EVLDD and the storage capacitor $Cs_T$ can be connected to a gate electrode of the driving transistor T1, such that it is charged with a driving voltage of the driving transistor T1. The driving transistor T1 can control the current that drives the light emitting device (e.g., OLED) 302 by the driving voltage stored in the storage capacitor $CS_T$.

Transistor T3 can be controlled by scan signals nSCAN[n] supplied on line 311, and a gate electrode and a drain electrode of the driving transistor T1 can be connected by transistor T3 to make a diode connected driving transistor T1, enabling the data voltage from DATA[k] supplied on line 306 to be stored in the storage capacitor $Cs_T$ after the threshold voltage compensated during a sampling period of the circuit 300.

Transistor T2 can be controlled by the scan signals pSCAN[n] on line 310 to supply the data voltage DATA[k] from the data line 306 to a source electrode of the driving transistor T1 during a sampling period of the circuit 300.

Transistor T5 can be controlled by a light emitting control signals EM[n] on line 312 to supply a high voltage supply voltage ELVDD to a source electrode of the driving transistor T1 during a light emitting period of the circuit 300.

Transistor T6 can be controlled by the light emitting control signals EM[n] on the line 312, such that driving current is supplied from the driving transistor T1 to the light emitting device (e.g., OLED) 302 during a light emitting period of the circuit 300.

Transistor T4 can be controlled by the scan signal nSCAN [n-1] on line 308 to initialize the storage capacitor $Cs_T$ and a gate electrode of the driving transistor T1 to an initialization voltage $V_{INIT}$ during an initialization period of the circuit 300.

Transistor T7 can be controlled by the scan signals pSCAN[n] on line 310 to initialize an anode of the light emitting device (e.g., OLED) 302. Transistor T7 can be turned on in response to the scan signal pSCAN[n] during a sampling period of the circuit 300 to initialize an anode of the device 302 to the initialization voltage $V_{INIT}$.

Referring to FIG. 3B, when signal EM[n] is high, then transistors T6 and T5 are turned off and driving current is not supplied to device 302. While EM[n] is high, when nSCAN [n-1] is high, the storage capacitor $Cs_T$ and the gate of the driving transistor T1 are initialized with voltage $V_{INIT}$. Then, when nSCAN[n-1] and pSCAN[n] are low and when nSCAN[n] is high, the voltage DATA[k] is loaded on storage capacitor $Cs_T$, for use in setting the luminance output of the device 302 when EM[n] subsequently goes low.

In some implementations as shown in FIG. 3A, metal oxide transistors can be used for T3 and T4 to reduce the effect of off-state leakage current in the circuit 300, which can cause the luminance of the light emitting device 302 to change during a display cycle, especially for relatively long frame times (e.g., at low refresh rates). In some implementations, even while metal oxide transistors are used for T3 and T4, LTPS transistors can be used for T1, T2, T5, T6, and T7 to handle other factors that affect optical artifacts (e.g., flicker) at low refresh rates and to maintain a small footprint of the circuit 300.

While the use of metal oxide transistors in the pixel circuit can reduce the pixel luminance change over time and can enable the very low display refresh rate, (e.g., 30 Hz, 10 Hz, 1 Hz), some optical artifacts (e.g., flicker) still can occur at, or when switching to, low frame rates. Thus, to enable the low frame rates in the display with acceptably low flicker artifacts, the self-refresh operation in the display can be applied to the circuit 300 of FIG. 3A one or more times per frame period. This self-refresh operation can be used to initialize the transistor hysteresis status and to initialize/reset the anode electrode of light emitting device 302 in the pixel during the frame period. Without this self-refresh operation, the active area of the display panel may exhibit flicker at a low frame rate when it displays dim images (i.e., when relatively low emission current is applied to the emitting devices 302 of the panel).

Figure 4A:
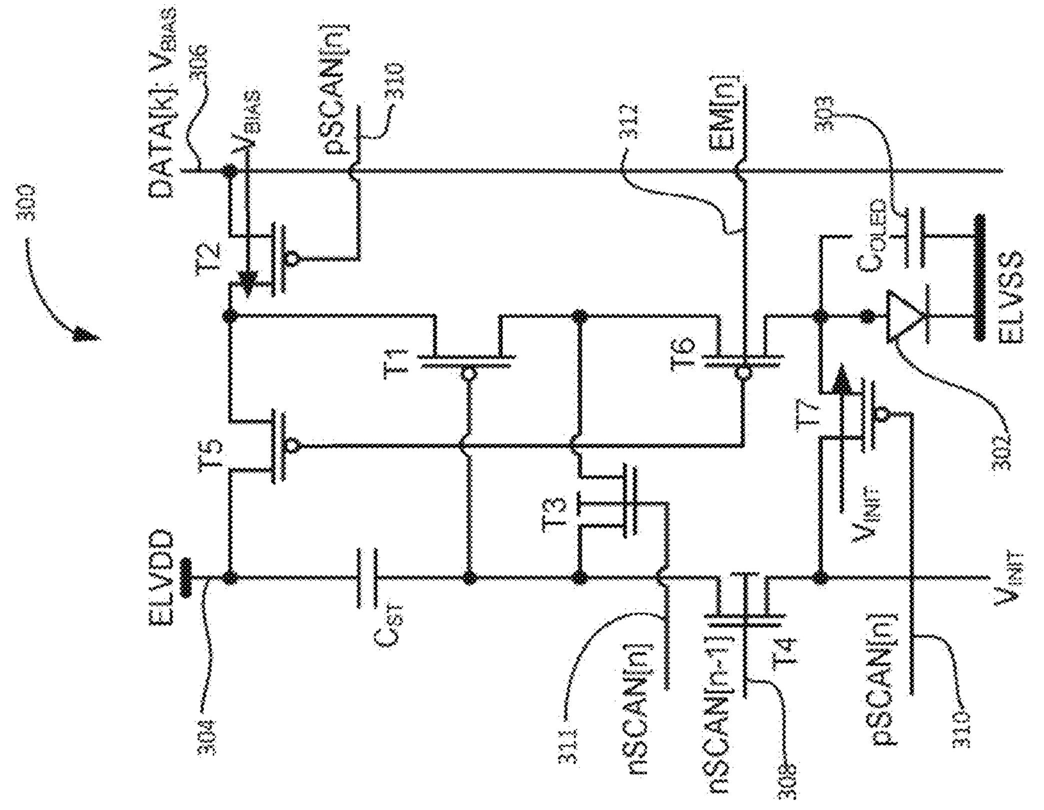
FIG. 4A is a schematic diagram of a circuit for driving a light emitting device when a self-refresh operation is applied to the circuit.
Figure 4B:
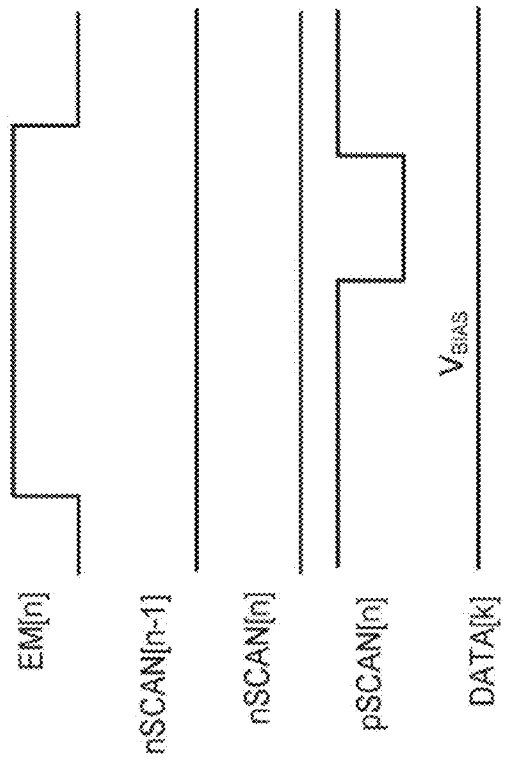
FIG. 4B is a schematic timing diagram of signals for controlling the self-refresh operation of the circuit of FIG. 4A.

FIG. 4A is a schematic diagram of the circuit 300 when a self-refresh operation is applied to the circuit. FIG. 4B is a schematic timing diagram for controlling the self-refresh operation of the circuit 300.

During the self-refresh operation, inputs nSCAN[n] and nSCAN[n-1] to lines 311 and 308, respectively, are low, so transistor T3 and T4 are off. When pSCAN[n] is low, transistor T7 is on, and the anode electrode voltage is initialized by $V_{INIT}$. In addition, when the EM[n] signal is high, the emission control switches, T5 and T6, are turned off, and a bias voltage, $V_{BIAS}$, is applied on the line 306 by the DATA[k] signal. Then, when pSCAN[n] is low to turn on T2 transistor, the transistor hysteresis status is initialized by the application of $V_{BIAS}$ to the source of transistor T1, so that when the data signal is applied again on line 306 the luminance of the light emitting device 302 ramps up to its intended value.

Figure 4C:
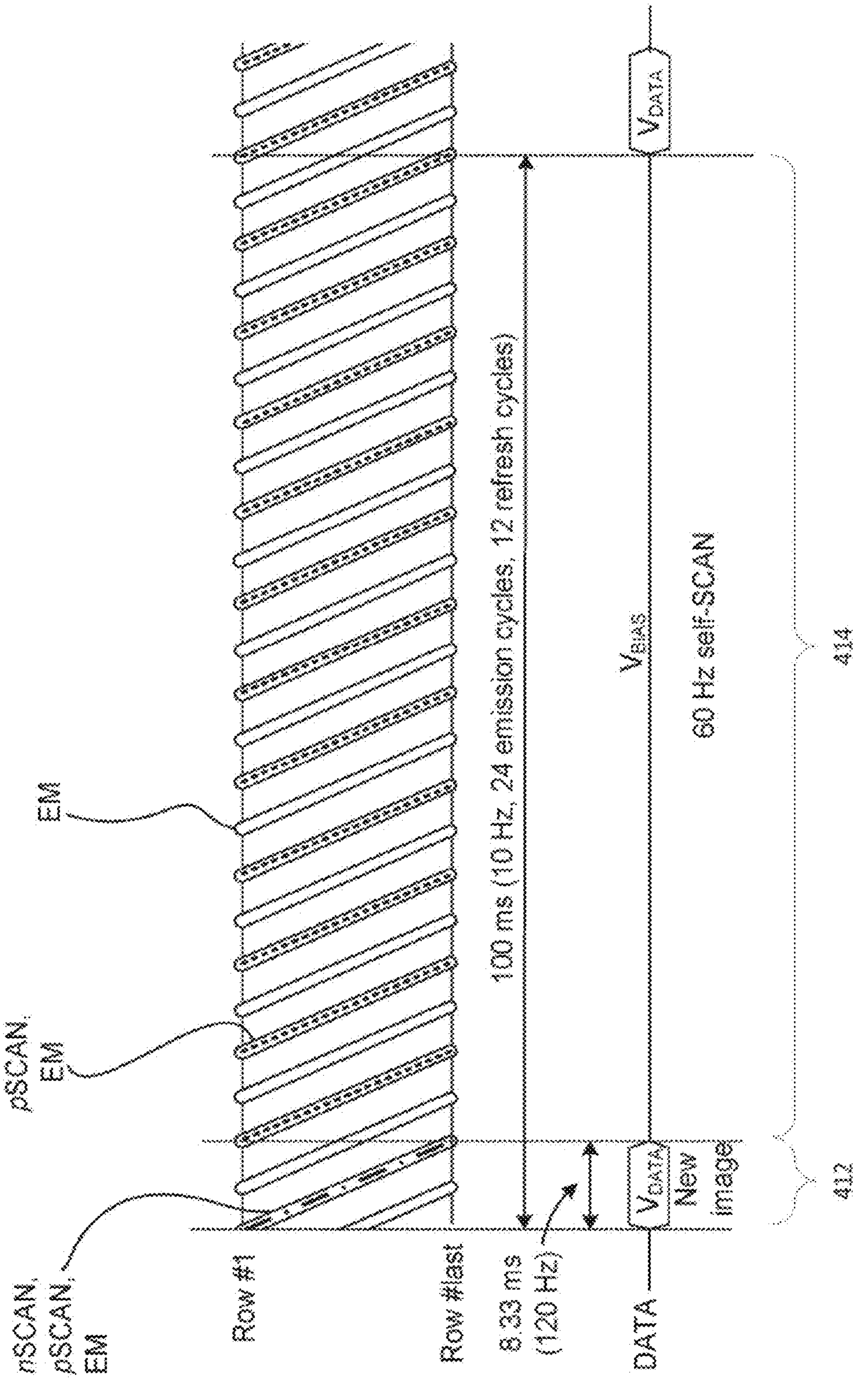
FIG. 4C is another schematic timing diagram of signals for controlling the self-refresh operation of the circuit of FIG. 4A.

FIG. 4C is another schematic timing diagram of signals for controlling the self-refresh operation of the circuit of FIG. 4A. In particular, the timing diagram of FIG. 4C illustrates signals provided to pixel circuits associated with rows of pixels, where the pixel circuits are operated at a 10 Hz frame rate with a 120 Hz self-refresh rate, so that optical properties of the display when rendering images with a 10 Hz frame rate can appear similar to those of the display when rendering images with a 120 Hz frame rate. Diagonal lines in the upper part of the timing diagram illustrate the application of nSCAN[n], pSCAN[n], and EM[n] signals to the pixel circuits associated with the rows of pixels, from the first row to the last row. Unfilled diagonal lines represent the application of EM[n] signals to the pixel circuits. Diagonal lines filled with a dotted line represent the application of EM[n] signals and pSCAN[n] signals to the pixel circuits. Diagonal lines filled with a dashed-dotted line represent the application of EM[n] signals, pSCAN[n] signals, and nSCAN[n] signals to the pixel circuits.

In an image writing time window 412, nSCAN[n] signals, pSCAN[n] signals, EM[n] signals, and DATA[K] signals are written to the circuits to refresh the image data to be applied to pixels during a frame as demonstrated in FIG. 3B. The signals are written over a 8.33 ms time period, corresponding to the image refresh time for a 120 Hz refresh rate for the display.

After the image data is refreshed during the image wring time window 412, in the remaining 91.67 ms of the frame period, which can be referred to a self-refresh period 414, self-refresh operations are applied to the pixel circuits at a rate of 120 Hz in response to the application of pSCAN[n] signals (shown by dotted lines in FIG. 4C) applied to the pixel circuit at this rate, where pSCAN[n] signals initialize/reset the anode electrodes of light emitting device in the pixels. As explained herein with reference to FIGS. 4A and 4B, during the self-refresh operations, EM[n] signals and pSCAN[n] signals are written to the pixel circuits and a value of VBIAS is applied by the DATA[k] signals, but the nSCAN[n] signals remain low throughout the period 414. In this manner, the optical performance of the display panel during low frame rate (e.g., 10 Hz) operation of the panel can be similar to the optical performance of the display panel when it is operated at its maximum frame rate (e.g., 120 Hz), because the temporal length, and rate, of optical emission pulses can be the same for both frame rates.

Figure 5A:
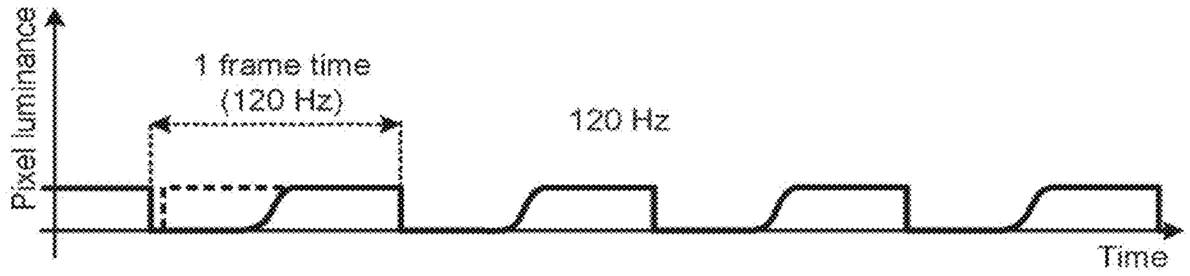
FIG. 5A is a schematic graph of the instantaneous luminance of a pixel as a function of time over four frames when the pixel is operated at a 120 Hz frame rate and a 120 Hz image refresh rate.
Figure 5B:
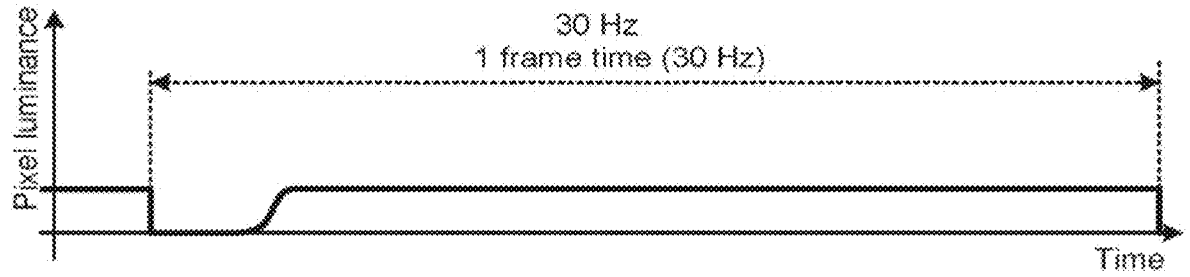
FIG. 5B is a schematic graph of the instantaneous luminance of a pixel as a function of time over one frame when the pixel is operated at a 30 Hz frame rate and at a 30 Hz image refresh rate.
Figure 5C:
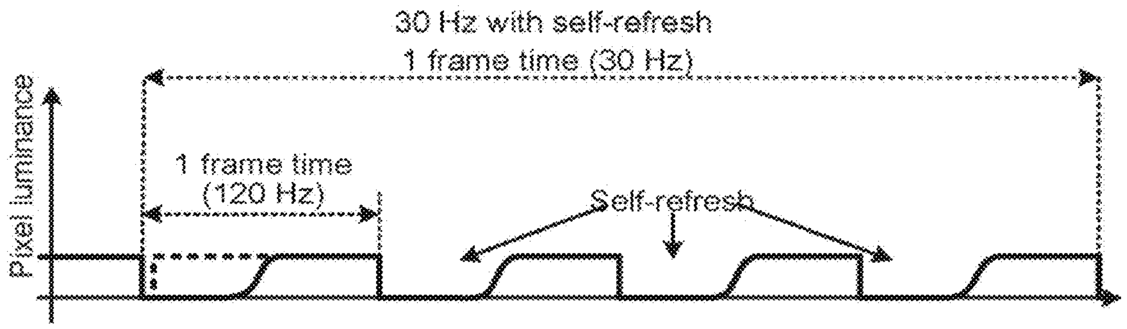
FIG. 5C is a schematic diagram of the instantaneous luminance of a pixel as a function of time when the pixel is operated at a 30 Hz frame rate and refreshes the image once per frame and performs a self-refresh operation three times per frame period.

The effect of the self-refresh operation on the luminance output of the light emitting device 302 is shown by FIGS. 5A, 5B, and 5C.

FIG. 5A is a schematic graph of the instantaneous luminance of a pixel as a function of time over four frames when the pixel is operated at a 120 Hz frame rate and a 120 Hz image refresh rate. Within the period of one frame, the luminance of the pixel ramps up from a low level (e.g., zero) to an upper level. However, at least for OLED devices 302, the luminance does not increase from zero immediately at the beginning of the frame, especially when the pixel luminance is low and the pixel driving current is low. Rather, the anode electrode voltage of the light emitting device, OLED device 302, increases relatively slowly from the initialized voltage level, $V_{INIT}$, to the required voltage levels for the intended luminance due to the OLED capacitance 303 shown in FIG. 3A. Therefore, especially when the pixel luminance is low and the pixel driving current is low, the pixel luminance in the graph of FIG. 5A is not a series of closely-spaced rectangular pulses (as shown by the dotted line for the for the first frame) but rather shows four pulses that are separated from each other in time and that each include an initial ramp of the luminance as a function of time. Due to the initial ramp in luminance and the temporal gaps between periods of luminance, a flickering of the display may be perceived by a human viewer. The perception of flickering may be more noticeable at lower frame rates compared to higher frame rates. Additionally, when the pixel luminance is high and the pixel driving current is high, then the pixel luminance tends to rise from its minimum value earlier during the frame period such that the luminance curve in practice (shown in the solid line) approaches the idea curve (shown in the dashed line). As such, flickering may be perceived more noticeably at low luminance levels than at high luminance levels. At some frame rates that exceed a threshold rate, flickering may be imperceptible, even at low luminance levels, because the frame rate is high enough for the time averaged luminance to be perceived as a constant luminance.

FIG. 5B is a schematic graph of the instantaneous luminance of a pixel as a function of time over one frame when the pixel is operated at a 30 Hz frame rate and at a 30 Hz image refresh rate. The single frame shown in the graph of FIG. 5B is rendered in the same amount of time as the four frames shown in the graph of FIG. 5A. However, the time-averaged light output from the pixel when the pixel is operated at the 30 Hz frame rate is different from the time-averaged light output when the pixel is operated at the 120 Hz frame rate, and because of this, when the display panel is operated in a mode that uses different frame rates, the different optical performance of the different frame rates causes unpleasant artifacts for a viewer of the device.

FIG. 5C is a schematic diagram of the instantaneous luminance of a pixel as a function of time when the pixel is operated at a 30 Hz frame rate and refreshes the image (i.e., writes new data signals to the pixels) once per frame and performs a self-refresh operation three times per frame period, so that the pixel has a 120 Hz refresh rate. As seen from a comparison of the graph of FIG. 5C with the graph of FIG. 5A, the optical performance of the pixel when operated at a 30 Hz frame rate with a self-refresh operation performed three times per frame period is identical to the performance of the pixel when operated at a 120 Hz frame rate. Thus, in general, when a display is designed and configured to operate at a maximum frame rate of N Hz, the display can be operated at a lower frame rate of M Hz with an intra-frame self-refresh rate of (N/M−1), where N/M is an integer (i.e., where M is a factor of N).

However, operating the display panel at a frame rate of 30 Hz with a 120 Hz refresh rate can increase the power consumption of the panel compared to operating the panel at a frame rate of 30 Hz with operating the display panel at a frame rate of 30 Hz with a 30 Hz refresh rate, because of the losses associated with parasitic capacitance when driving the transistors to refresh pixels of the display.

Thus, to reduce power consumption of the display panel, while maintaining acceptable optical performance of the active area of the panel, self-refresh operations of the panel can be reserved for use when they are needed to maintain optical performance but not used when it would sacrifice efficient power utilization by the panel.

In one implementation, for a display that is configured to operate with a plurality of different operational frame rates, self-refresh operations may not be applied for a plurality frame rate at or above a threshold frame rate, and for frame rates below the threshold frame rate, self-refresh operations may be based on an operational frame rate that is lower than a maximum operational frame rate of the panel. For example, in a display panel that is configured to operate at frame rates of, for example, 120 Hz, 90 Hz, 60 Hz, 30 Hz, 15 Hz, 10 Hz, 5 Hz, and 1 Hz, self-refresh operations may not be performed for any frame rates above a threshold rate of 60 Hz, while operation at the 30 Hz frame rate may include one intra-frame self-refresh, operation at the 15 Hz frame rate may include three intra-frame self-refreshes, operation at the 10 Hz frame rate may include five intra-frame self-refreshes, operation at the 5 Hz frame rate may include eleven intra-frame self-refreshes, and operation at the 1 Hz frame rate may include fifty-nine intra-frame self-refreshes. Applying intra-frame self-refresh operations only when the frame rate is below a threshold value, but not when the frame rate is at or above the threshold value, may be acceptable when the threshold value is high enough for flicker artifacts to be imperceptible to a user when frame rates at and above the threshold rate are used.

With a threshold frame rate of 60 Hz, self-refresh operations are not used for the 120 Hz, 90 Hz, and 60 Hz frame rates, which are at or above the threshold frame rate. The 60 Hz frame rate can be the basis frame rate on which the number of intra-frame self-refresh operations used in the lower frame rates (e.g., 30 Hz, 15 Hz, 10 Hz, 5 Hz, and 1 Hz) is based. By using the 60 Hz frame rate as the basis frame rate, rather than the 120 Hz or 90 Hz frame rate, the number of intra-frame self-refresh operations needed for the frame rates that are below the threshold frame rate can be reduced, thus reducing power consumption by the display panel.

Figure 5D:
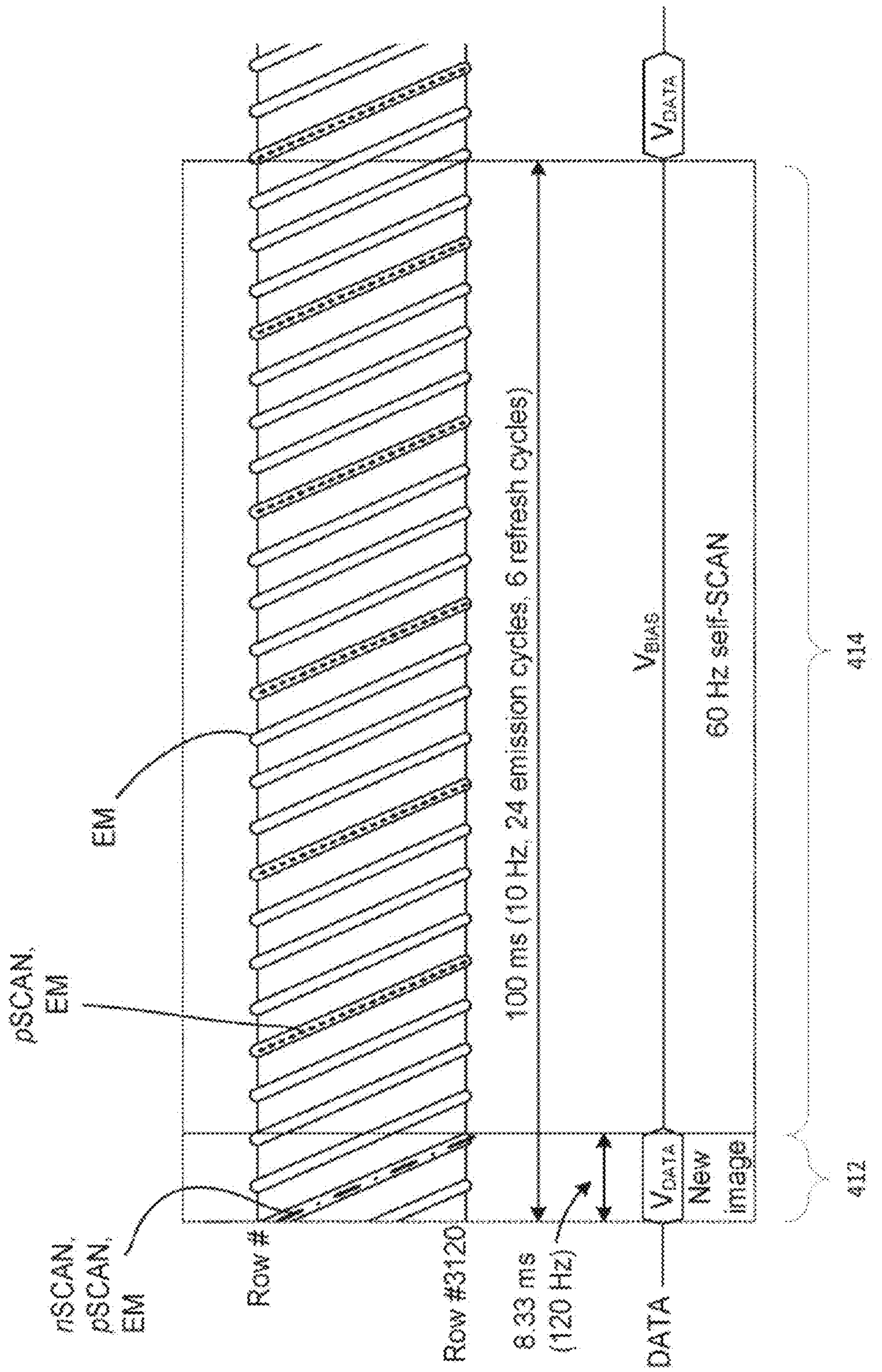
FIG. 5D is another schematic timing diagram of signals for controlling the self-refresh operation of the circuit of FIG. 4A.

FIG. 5D is another schematic timing diagram of signals for controlling the self-refresh operation of the circuit of FIG. 4A, when the basis frame rate for self-refresh operations (e.g., 60 Hz) is lower than the maximum operational frame rate (e.g., 120 Hz) for the display panel. In particular, the timing diagram of FIG. 5D is similar to the timing diagram of FIG. 4C, with the exception that pSCAN[n] signals are applied at a rate of 60 Hz, rather than at a rate of 120 Hz, as in FIG. 4C, so that self-refresh operations are performed according to the signals depicted in FIG. 5D at half the rate as they are according to the signals depicted in FIG. 4C, which reduces power consumption. With EM[n] signals being provided at the same rate in FIGS. 4C and 5D, the optical performance of the display panel during low frame rate (e.g., 10 Hz) with self-refresh operations being performed at a rate of 60 Hz can be identical to the optical performance of the display panel when it is operated at its basis frame rate (e.g., 60 Hz), because the temporal length, and rate, of optical emission pulses can be the same for both frame rates, and the output of the OLED devices is refreshed at the same rate. The optical performance of the display panel during low frame rate (e.g., 10 Hz) with self-refresh operations being performed at a rate of 60 Hz also can be similar to the optical performance of the display panel when it is operated at its maximum frame rate (e.g., 120 Hz), because the temporal length, and rate, of optical emission pulses can be the same for both frame rates, although it may not be identical because the refresh rates are different for the different frame rates.

Because of the self-refresh operations used for the lower frame rates that are factors of the basis frame rate, the optical performance of the lower frame rate can mimic the optical performance of the basis frame rate, as can be seen from a comparison of FIG. 5C and FIG. 5A. Therefore, a single gamma correction value can be used for the basis frame rate and for the lower frame rates that are factors of the basis frame rate. However, for frame rates higher than the threshold frame rate, different gamma correction values can be used to ensure a consistent optical performance of the display panel across all of the possible frame rates that may be used by the panel. Referring to FIG. 2, the gamma correction values used for the different frame rates can be stores in the gamma buffer 224.

Table 1 provides example parameters for use in display panel that is designed and configured to operate with a plurality of different frame rates, with a threshold frame rate of 60 Hz. For frame rates at and above the threshold frame rate (e.g., 120 Hz, 90 Hz, 60 Hz), intra-frame self-refresh operations are not used, whereas for frame rates below the threshold frame rate, which are factors of the threshold frame rate, intra-frame self-refresh operations are used. Additionally, an identical gamma correction value can be used for frame rates at and below the threshold frame rate, where the frame rates are factors of the threshold frame rate.

| Frame Rate | Self-refresh? | Gamma setting |
|---|---|---|
| 120 Hz | No | Gamma A, 120 Hz gamma |
| 90 Hz | No | Gamma B, 90 Hz gamma |
| 60 Hz | No | Gamma C, 60 Hz gamma |
| 30 Hz | Yes | Gamma C, 60 Hz gamma |
| 15 Hz | Yes | Gamma C, 60 Hz gamma |
| 10 Hz | Yes | Gamma C, 60 Hz gamma |
| 5 Hz | Yes | Gamma C, 60 Hz gamma |
| 1 Hz | Yes | Gamma C, 60 Hz gamma |

In another implementation, for a display panel that is configured to operate with a plurality of different operational frame rates, when the display panel is operated with a particular frame rate, self-refresh operations can be applied to frames that are relatively dim but not to frames that are relatively bright, because flickering artifacts are more noticeable for dim frames than for bright frames. In an example implementation, a threshold at which to turn on self-refresh operations for a particular operational frame rate can be determined based on a system level brightness of the active area of the display. For example, a system level brightness may be controlled by a user according to the user's preference (e.g., by adjusting a brightness level for the output of a display panel), or in response to a signal from an ambient light sensor that may be included in the display panel, in a device that incorporates the display panel, or in another device. For panel brightness levels that exceed a threshold brightness level, self-refresh operations may not be applied when the display panel is operated in with a particular frame rate, while for panel brightness levels that are lower than the threshold brightness level, self-refresh operations may be applied when the display panel is operated in with the particular frame rate. The threshold brightness level may be different for different frame rates. For example, the threshold brightness level may be higher for lower frame rates than for higher frame rates. A brightness level of the display panel need not be measured empirically, but can be inferred from a system setting of the display panel, which is used to control the brightness of the display.

Figure 6:
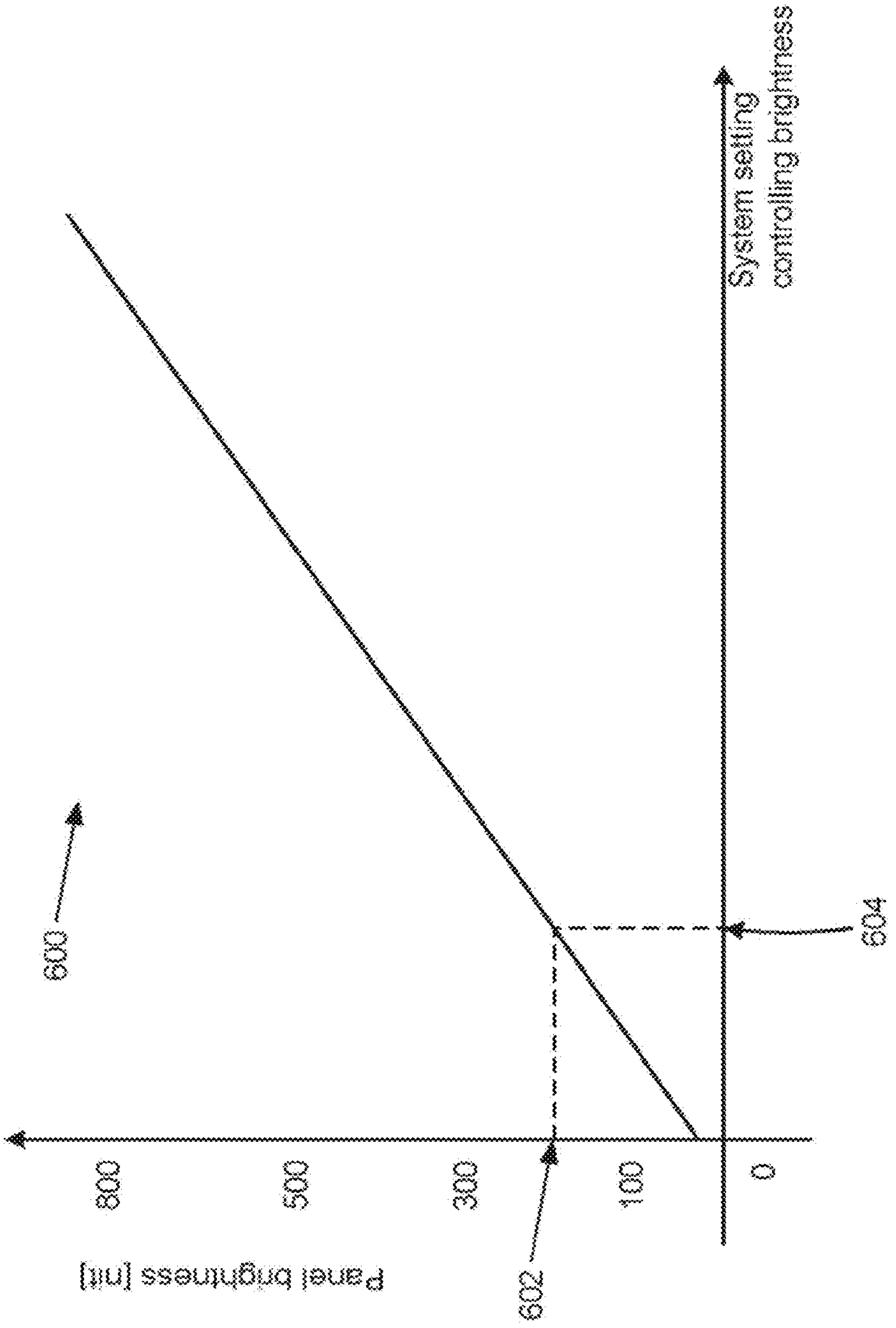
FIG. 6 is a schematic graph of an example relationship of between a brightness level of a display panel and a system level setting for the display panel that controls the brightness.

FIG. 6 is a schematic graph 600 of an example relationship of between a brightness level of a display panel and a system level setting for the display panel that controls the brightness. A threshold brightness 602 below which intra-frame self-refresh operations are to be applied to the panel for a particular frame rate can be identified, and a threshold value 604 of a system setting value that produces the threshold brightness 602 can be determined. Then, for system setting values below the threshold value, intra-frame self-refresh operations are applied to the panel for the particular frame rate.

In another implementation, for a display panel that is configured to operate with a plurality of different operational frame rates, when the display panel is operated with a particular frame rate, the determination of whether to apply self-refresh operations to a frame can be based on a determined gray level of the frame. For example, self-refresh operations can be applied to frames that have relatively low gray levels but not to frames that have relatively high gray levels, because while flickering artifacts are more noticeable for frames with low gray levels, such artifacts may be imperceptible for frames with high gray levels. The determined gray level of a frame can be based on, for example, the mean gray level of a pixel in the frame, the median gray level of a pixel in the frame, the proportion of pixels in the frame having a gray level below a threshold level, etc. The gray levels for individual pixels in a frame can be determined from the signals passed by the external processor 230 to the display panel 200 or by the device driver 216, where the signals are used to encode information for generating images on the display panel 200.

Figure 7:
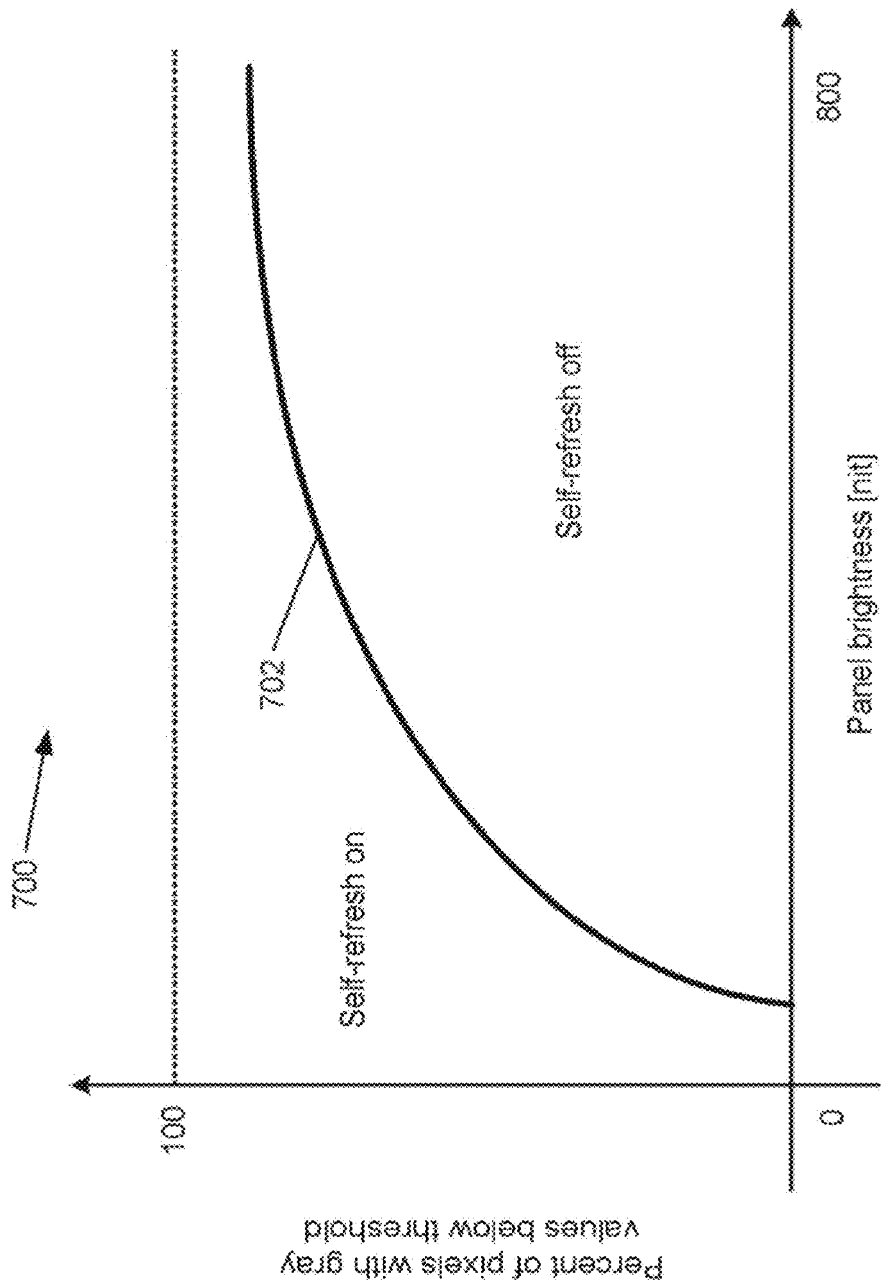
FIG. 7 is a schematic graph of a threshold curve that determines whether to apply self-refresh operations to a frame.

In some implementations, the determination of whether to apply self-refresh operations to reframe can be based on both a determined gray level of the frame and a brightness setting for the active area of the display panel that renders the frame to a user. FIG. 7 is a schematic graph 700 of a threshold curve 702 that determines whether to apply self-refresh operations to a frame. The threshold curve 702 can be a function of the panel brightness value (shown on the X-axis of the graph) and a gray level value of the frame (shown on the Y-axis of the graph). As shown in the graph 700 of FIG. 7, the gray level value of the frame on the Y axis of the graph represents the percentage of pixels in the frame that have a gray value less than a threshold value. For example, if the possible gray values for a pixel range from 0 to 255, a threshold gray value of 64 may be used as a parameter to determine a gray level value for a frame on the basis of the percentage of pixels in the frame having a gray value below the threshold gray value. When parameterized in this way, when the percentage of pixels in the frame having a gray value below the threshold gray value is high, then the gray level value of the frame is low, and when the percentage of pixels in the frame having a gray value below the threshold gray value is low, then the gray level value of the frame is high. Therefore, as displayed in graph 700 of FIG. 7, the gray level of a frame decreases from the origin of the graph as the percentage of pixels in the frame having a gray value below the threshold gray increases.

In an implementation, the threshold curve 702 can be a monotonically increasing function of the panel brightness value and a monotonically decreasing function the gray level value of the frame—that is, for any point on the threshold curve 702, the partial derivative of the curve 702 with respect to the gray level value is negative and the partial derivative of the curve 702 with respect to the panel brightness value is positive. As shown in the graph 700, for points above and to the left of the threshold curve 702, intra-frame self-refresh operations can be applied to a frame, while for points below and to the right of the threshold curve 702, intra-frame self-refresh operations are not applied to a frame.

Referring to FIG. 2, in some implementations, the determination of whether the panel brightness value and the grade level value for a frame are above or below the threshold curve 702 can be performed by the display driver 216. In some implementations, determination can be performed by the external processor 230 (e.g., a graphics processing unit or included in a SoC).

Referring again to FIG. 5B and FIG. 5C, different gamma correction values may be used when rendering a frame at a particular frame rate when intra-frame self-refresh operations are turned on as compared with rendering your frame the particular frame rate and inter-frame self-refresh operations returned off. For example, as seen from FIG. 5B and FIG. 5C, even though a pixel may be programmed with the same DATA[k] voltage value to achieve the same maximum pixel luminance during a frame period, the time-averaged pixel luminance perceived by the user will be different because of the different total blank time (i.e., the time in which the pixel luminance is at or close to zero) of the pixel is different, depending on whether self-refresh operations are applied. In particular, the perceived pixel luminance decreases when intra-frame self-refresh operations are applied to the frame. Therefore, to prevent a difference in the perceived pixel luminance, different gamma correction values can be used when rendering a frame when self-refresh operations are applied than when rendering a frame without self-refresh operations.

As explained above, a display panel can be configured to operate with three or more different frame rates that can include a maximum frame rate and two or more lower frame rates. When the display panel operates in each of the different frame rates, light pulses can be emitted from pixels of the display panel at a rate that is equal to the maximum frame rate. A basis frame rate that is lower than the maximum frame rate can be used as the rate at which refresh operations, including an image refresh operation and one or more self-refresh operations, are applied when frame rates lower than the basis frame rate are used. The effect of the self-refresh operation on the luminance output of the light emitting device 302 is shown by FIGS. 8A, 8B, and 8C.

Figure 8A:
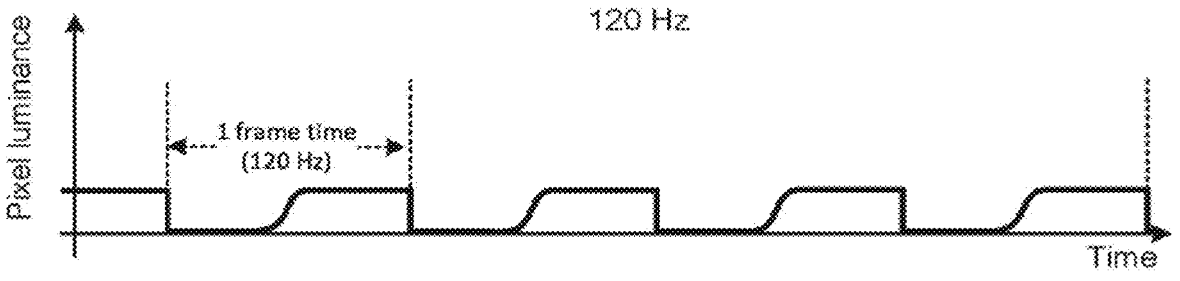
FIG. 8A is a schematic graph of the instantaneous luminance of a pixel as a function of time over four frames when the pixel is operated at a 120 Hz frame rate and a 120 Hz image refresh rate.

FIG. 8A is a schematic graph of the instantaneous luminance of a pixel as a function of time over four frames when the pixel is operated at a 120 Hz frame rate and a 120 Hz image refresh rate. The 120 Hz frame rate is the maximum frame rate for the panel in this example. Within the period of one frame time, the luminance of the pixel ramps up from a low level (e.g., zero) to an upper level. Then, the pixel is refreshed in an image refresh operation, new data is written, and a new frame is displayed in a subsequent frame time. The image refresh operation occurs at a rate of 120 Hz.

Figure 8B:
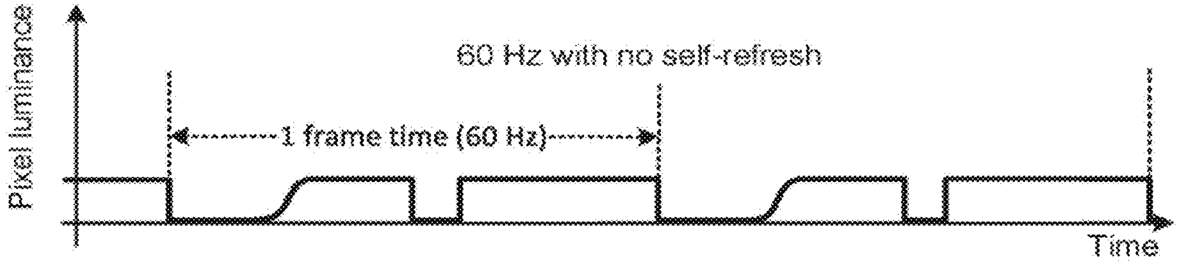
FIG. 8B is a schematic graph of the instantaneous luminance of a pixel as a function of time over two frames when the pixel is operated at a 60 Hz frame rate and a 120 Hz image refresh rate.

FIG. 8B is a schematic graph of the instantaneous luminance of a pixel as a function of time over two frames when the pixel is operated at a 60 Hz frame rate and a 120 Hz image refresh rate. Within the period of one frame time, the luminance of the pixel ramps up from a low level (e.g., zero) to an upper level. Then, the light output is turned off and back on, so that that two light pulses are emitted at a rate of 120 Hz during one frame time. After the frame ends, the pixel is refreshed in an image refresh operation, new data is written, and a new frame is displayed in a subsequent frame time. Because the pixel is refreshed only at the beginning of the frame and not during the frame, when the second light pulse is emitted, the second light pulse does not include a slowly-increasing luminance of the pixel. Therefore, the temporal profile of the pixel luminance is different in FIG. 8A than in FIG. 8B, such that different gamma correction values are used for the 120 Hz maximum frame rate and the 60 Hz basis frame rate that does not include a self-refresh operation.

Figure 8C:
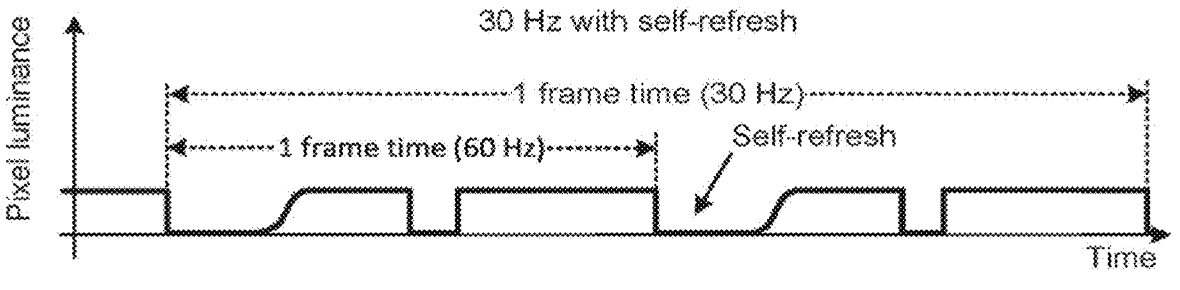
FIG. 8C is a schematic graph of the instantaneous luminance of a pixel as a function of time over one frame when the pixel is operated at a 30 Hz frame rate and a 120 Hz image refresh rate.

FIG. 8C is a schematic graph of the instantaneous luminance of a pixel as a function of time over one frame when the pixel is operated at a 30 Hz frame rate and a 120 Hz image refresh rate. Within the period of one frame time, the luminance of the pixel ramps up from a low level (e.g., zero) to an upper level. Then, the light output is turned off and back on at a rate of 120 Hz, so that that four light pulses are emitted at a rate of during one frame time. After the frame ends, the pixel is refreshed in an image refresh operation, new data is written, and a new frame is displayed in a subsequent frame time. During the frame time, a self-refresh operation is applied to the pixel at a rate of 60 Hz (to match the frame rate of the 60 Hz basis rate), and, therefore, the temporal profile of the pixel luminance in FIG. 8C is identical to that of that in FIG. 8B, such that a single gamma correction value can be 30 Hz frame rate and the 60 Hz basis frame rate.

So that a single gamma correction value can be used for each of the frame rates (e.g., 120 Hz, 60 Hz, and 30 Hz), pixel circuits for driving the pixels of the display panel can be configured and controlled to operate the display panel in each of the different frame rates using a single gamma correction value for all of the different frame rates.

In one implementation, when the display panel is operated at the maximum frame rate (e.g., 120 Hz), the anodes of the OLEDs in the panel can be discharged at rate of 60 Hz, so that the temporal profile of the pixel luminance in FIG. 8A is changed to match the temporal profile of the pixel luminance in FIG. 8B.

FIG. 9A is a schematic diagram of a circuit 900 for driving a light emitting device (e.g., an organic light emitting diode (OLED)) 902 of a pixel in an active area of a display panel, for supplying a data signal to the device 902 and for refreshing the device 902 to receive a new data signal. The circuit 900 can be used to drive the device 902 at a frame rate having a first frequency and to discharge an anode of the device at a second frequency that is half of the first frequency.

The light emitting device 902 can have a capacitance (represented by capacitor 903), such that changing a voltage level across the light emitting device 902 dissipates power.

The circuit 900 can be connected to an initialization voltage supplying line 909 that supplies an initialization voltage $V_{INIT}$, a first power line 904 that supplies a voltage ELVDD, and a data line 906 that supplies a data voltage DATA[k]. Additionally, the circuit 900 can be connected to an n-(n-1)$^{th}$ scan line 908 that supplies signals nSCAN[n-1], to an p-n$^{th}$ scan line 910 that supplies signals pSCAN[n], to an n-n$^{th}$ scan line 911 that supplies signals nSCAN[n], and to an emission line 912 that supplies signals EM[n].

The circuit 900 can include a driving transistor T1, second to sixth transistors T2 to T7, and a storage capacitor $Cs_T$, which are configured to drive the light emitting device 902. Each of the transistors T1 to T7 can be implemented using p-channel or n-channel thin film transistor (TFT) technology. In an example implementation, transistors T3 and T4 are implemented as n-channel transistors, while transistors T1, T2, T5, T6, and T7 are implemented as p-channel transistors. For example, transistors T1, T2, T5, T6, and T7 can be low-temperature poly-silicon (LTPS) transistors, and transistors T3 and T4 can be metal oxide transistors.

The light emitting device (e.g., OLED) 902 can include an anode connected to the driving transistor T1 through the driving current control switch transistor, T6, a cathode connected to a low voltage supply voltage ELVSS, and a light emitting layer between the anode and the cathode that generates light, where the amount of generated light is proportional to the amount of current supplied from the driving transistor T1.

A first electrode of the storage capacitor $Cs_T$ of the circuit 900 can be connected to the line 904 that supplies voltage EVLDD and of the storage capacitor $Cs_T$ can be connected to a gate electrode of the driving transistor T1, such that it is charged with a driving voltage of the driving transistor T1. The driving transistor T1 can control the current that drives the light emitting device (e.g., OLED) 902 by the driving voltage stored in the storage capacitor $Cs_T$.

Transistor T3 can be controlled by scan signals nSCAN[n] supplied on line 911, and a gate electrode and a drain electrode of the driving transistor T1 can be connected by transistor T3 to make a diode connected driving transistor T1, enabling the data voltage from DATA[k] provided on line 306 to be stored in the storage capacitor $Cs_T$ after the threshold voltage compensated during a sampling period of the circuit 900.

Transistor T2 can be controlled by the scan signals pSCAN1[n] on line 910 to supply the data voltage DATA[k] from the data line 906 to a source electrode of the driving transistor T1 during a sampling period of the circuit 900.

Transistor T5 can be controlled by a light emitting control signals EM[n] on line 912 to supply a high voltage supply voltage ELVDD to a source electrode of the driving transistor T1 during a light emitting period of the circuit 900.

Transistor T6 can be controlled by the light emitting control signals EM[n] on the line 912, such that driving current is supplied from the driving transistor T1 to the light emitting device (e.g., OLED) 902 during a light emitting period of the circuit 900.

Transistor T4 can be controlled by the scan signal nSCAN [n-1] on line 908 to initialize the storage capacitor $Cs_T$ and a gate electrode of the driving transistor T1 to an initialization voltage $V_{INIT}$ during an initialization period of the circuit 900.

Transistor T7 can be controlled by the scan signals pSCAN2[n] on line 909 to initialize an anode of the light emitting device (e.g., OLED) 902. Transistor T7 can be turned on in response to the scan signal pSCAN2[n] during a sampling period of the circuit 900 to initialize an anode of the device 902 to the initialization voltage $V_{INIT}$.

Because the pSCAN1[n] signal on line 910 can be different from the pSCAN2[n] signal on line 909, the discharging of the anode of the OLED 902 can controlled independently from the updating of the DATA[k] signal supplied on line 906.

FIG. 9B schematic timing diagram of signals for controlling the image refresh and anode discharging operations of a pixel with the circuit of FIG. 9A, when the frame rate is higher than the basis frame rate (e.g., when the frame rate is 120 Hz and the basis frame rate is 60 Hz). In particular, the timing diagram of FIG. 9B indicates for the anode is not discharged for every frame that is rendered on the display panel. For example, in odd numbered frames (beginning with a first frame at the left of FIG. 9B), the image is refreshed and the anode is discharged in response to nSCAN, pSCAN1, pSCAN2, and EM signals applied to the pixels circuits, as explained herein with reference to FIG. 9A. This is represented in FIG. 9B the diagonal solid lines filled with a dashed-double-dotted line. In even numbered frames (beginning with a second frame from the left of FIG. 9B), the image is refreshed but the anode is not discharged in response to nSCAN, pSCAN1, and EM signals, applied to the pixels circuits, as explained herein with reference to FIG. 9A, while pSCAN2 remains high so that T7 is not turned on. This is represented in FIG. 9B the diagonal solid lines filled with a dashed line.

FIG. 9C is a schematic graph of the instantaneous luminance of a pixel as a function of time over a plurality of frames when the pixel is operated at a 120 Hz frame rate and the anode of the pixel is discharged at a rate of 60 Hz. As can be seen from the pixel luminance curve in FIG. 9C, every other frame includes a slowly ramping initial pixel luminance, while the other frames include a step-function turn-on of the pixel luminance.

Thus, the instantaneous luminance of a pixel as a function of time matches that of a pixel operated at a 60 Hz frame rate with no frame rate, as shown in FIG. 8B. Therefore, a single gamma correction value can be used for frames rendered at 120 Hz with skipped anode discharging, for frames rendered at 60 Hz with no self-refreshes, and for frames rendered at rates that are factors 60 Hz and that include self-refreshes.

In another implementation, rather than using separate pSCAN1 and pSCAN2 signals to transistors T2 and T7, respectively, to enforce skipped anode discharging in the rendering of multiple frames at 120 Hz, or in another frame rate that is higher than the basis frame rate, an identical signal can be applied as pSCAN[n] to the pixel circuit 300 shown in FIG. 4A, but the voltage level of the pSCAN[n] can be controlled so that it turns on T2 for all frames but turns on T7 for fewer than all the frames. For example, for rendering frames at a 120 Hz frame rate, the voltage levels can be controlled to turn on T7 at a rate of 60 Hz, so that the anode is discharged only in alternate frames. Referring again to FIG. 4A, the DATA[k] signals provided to the source of T2 can have voltage levels (e.g., +1 V to +6 V) that are higher than the $V_{INIT}$ voltage signals (e.g., −4 V) that are provided to the source of T7. Thus, if a high voltage level (e.g., +7 V) for the pSCAN signal is above the highest data voltage, and if a first low voltage level (e.g., −8 V) for the pSCAN signal is below $V_{INIT}$, both T2 and T7 can be turned on by the first low voltage level to discharge the anode of the pixel and to refresh the image data for driving the pixel. However, if a second low voltage level (e.g., −4 V) for the pSCAN signal is above $V_{INIT}$, but below the lowest DATA [k] voltage level, T2 can be turned on by the first low voltage level to refresh the image data for driving the pixel, while T7 remains off to prevent discharge the anode of the pixel.

FIG. 10 is a schematic diagram of a process for rendering images on a display panel according to techniques described herein. The process includes a method 1000 for rendering images on an active area of a display panel, where the display panel includes a plurality of pixels arranged in an array of OLED pixels, and were each pixel of the array includes an OLED light-emitting device, a plurality of pixel circuits, with each pixel circuit being associated with one of the OLED light-emitting devices and being configured to drive its associated OLED light-emitting device.

The method 1000 includes rendering images on the active area of the display panel with a plurality of different frame rates (1002). In addition, the method 1000 includes, when rendering images on the active area, for a plurality of the different frame rates having a frame rate that matches or is above a threshold frame rate, performing an image refresh operation once per frame period and not performing a self-refresh operation during the frame period (1004). The method 1000 also includes, when rendering images on the active area, for at least one of the different frame rates having a frame rate that is lower than the threshold frame rate, performing an image refresh operation once per frame period and performing a self-refresh operation at least once during the frame period (1006).

FIG. 11 is a schematic diagram of a process for rendering images on a display panel according to techniques described herein. The process includes a method 1100 for rendering images on an active area of a display panel, where the display panel includes a plurality of pixels arranged in an array of OLED pixels, and were each pixel of the array includes an OLED light-emitting device, a plurality of pixel circuits, with each pixel circuit being associated with one of the OLED light-emitting devices and being configured to drive its associated OLED light-emitting device.

The method 1100 includes rendering images on the active area of the panel with a plurality of different frame rates (1102). When rendering images on the active area, for a plurality of the different frame rates having a frame rate that matches or is above a threshold frame rate, an image refresh operation is performed once per frame period and not performing a self-refresh operation during the frame period (1104). When rendering images on the active area, for at least one of the different frame rates having a frame rate that is lower than the threshold frame rate, performing an image refresh operation once per frame period and performing a self-refresh operation at least once during the frame period (1106). A single gamma correction value is applied when rendering frames at one or more frame rates at and below the threshold rate and when rendering frames at a frame rate that is higher than the threshold rate (1108).

Various implementations of the systems and techniques described here can be realized in digital electronic circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method of operating a display device, comprising:
operating a display panel at a first image refresh rate that refreshes image data each first frame time, by performing during the first frame time:
(i) an image refresh operation, including by:
deactivating emission of light by a pixel that includes a light-emitting diode (LED) powered by a driving transistor;
initializing the LED and the driving transistor, while emission of light by the pixel remains deactivated;
providing a new data signal to the driving transistor, while emission of light by the pixel remains deactivated, and
activating emission of light by the pixel based on the new data signal that was provided to the driving transistor; and
(ii) an emission refresh operation, including by:
deactivating emission of light by the pixel; and
activating emission of light by the pixel, with the emission refresh operation skipping initialization of the LED and the driving transistor; and
operating the display panel at a second image refresh rate that is half the first refresh rate and that refreshes image data each second frame time that is twice a length of the first frame time, by performing during the second frame time:
(i) the image refresh operation;
(ii) a first instance of the emission refresh operation;
(iii) a self-refresh operation, including by:
deactivating emission of light by the pixel;
initializing the LED, while emission of light by the pixel remains deactivated; and
activating emission of light by the pixel, with the self-refresh operation skipping initialization of the driving transistor; and
(iv) a second instance of the emission refresh operation.

2. The method of claim 1, wherein operating the display panel at the first image refresh rate includes:
performing the image refresh operation at a beginning of the first frame time; and
performing the emission refresh operation half way through the first frame time.

3. The method of claim 2, wherein operating the display panel at the second image refresh rate includes:
performing the image refresh operation at a beginning of the second frame time;
performing the first instance of the emission refresh operation a quarter of the way through the second frame time;
performing the self-refresh operation half way through the second frame time; and
performing the second instance of the emission refresh operation three quarters of the way through the second frame time.

4. The method of claim 1, wherein:
providing a new data signal to the driving transistor involves storing the new data signal in a capacitor that is connected to a gate of the driving transistor.

5. The method of claim 1, wherein:
the self-refresh operation skips providing a new data signal to the driving transistor, while emission of light by the pixel remains deactivated.

6. The method of claim 1, comprising:
applying a gamma correction values to image data that is for presentation by the display panel during the first image refresh rate; and applying same said gamma correction values to image data that is for presentation by the display panel during the second image refresh rate.

7. The method of claim 1, wherein:

operating the display panel at the first image refresh rate provides a temporal profile of luminance of the pixel that is same as operating the display panel at the second image refresh rate.

8. The method of claim 1, wherein:

activating emission of light by the pixel during the image refresh operation involves ramping up luminance of the pixel; and activating emission of light by the pixel during the emission refresh operation involves a step-function turn-on of luminance of the pixel.

9. The method of claim 1, wherein;

initializing the LED involves applying an initialization value to the LED; and initializing the driving transistor involves applying the initialization value to the driving transistor.

10. The method of claim 1, comprising:

operating the display panel at a third image refresh rate that is twice the first refresh rate and that refreshes image data each third frame time that is half a length of the first frame time, by alternating between:

(a) performing the image refresh operation during the third frame time; and (b) performing a skipped LED discharge operation during the third frame time, including by:

deactivating emission of light by the pixel;

providing a new data signal to the driving transistor, while emission of light by the pixel remains deactivated; and activating emission of light by the pixel based on the new data signal that was provided to the driving transistor, with the skipped LED discharge operation skipping initialization of the LED.

11. The method of claim 10, wherein:

the first image refresh rate corresponds to a 60 Hz image refresh rate;

the second image refresh rate corresponds to a 30 Hz image refresh rate; and the third image refresh rate corresponds to a 120 Hz image refresh rate.

12. The method of claim 10, wherein:

the skipped LED discharge operation includes initializing the driving transistor, while emission of light by the pixel remains deactivated.

13. A display device, comprising:

a display panel that includes multiple pixels arranged in an array, including a pixel that includes a light-emitting diode (LED) powered by a driving transistor; and driving circuits that are configured to:

operate the display panel at a first image refresh rate that refreshes image data each first frame time, by performing during the first frame time:

(i) an image refresh operation, including by:

deactivating emission of light by a pixel that includes a light-emitting diode (LED) powered by a driving transistor;

initializing the LED and the driving transistor, while emission of light by the pixel remains deactivated;

providing a new data signal to the driving transistor, while emission of light by the pixel remains deactivated, and activating emission of light by the pixel based on the new data signal that was provided to the driving transistor; and (ii) an emission refresh operation, including by:

deactivating emission of light by the pixel; and activating emission of light by the pixel, with the emission refresh operation skipping initialization of the LED and the driving transistor; and operate the display panel at a second image refresh rate that is half the first refresh rate and that refreshes image data each second frame time that is twice a length of the first frame time, by performing during the second frame time:

(i) the image refresh operation;

(ii) a first instance of the emission refresh operation;

(iii) a self-refresh operation, including by:

deactivating emission of light by the pixel;

initializing the LED, while emission of light by the pixel remains deactivated; and activating emission of light by the pixel, with the self-refresh operation skipping initialization of the driving transistor; and (iv) a second instance of the emission refresh operation.

* * * * *